(12) United States Patent
Chen et al.

(10) Patent No.: US 8,963,426 B2
(45) Date of Patent: Feb. 24, 2015

(54) LED LIGHT

(75) Inventors: Ming-Yun Chen, Dong Guan (CN);
Zuo-Cai Hong, Dong Guan (CN)

(73) Assignee: Livingstyle Enterprises Limited, Dong Guan (CN)

( * ) Notice: Subject to any disclaimer, the term of this patent is extended or adjusted under 35 U.S.C. 154(b) by 0 days.

(21) Appl. No.: 14/131,160

(22) PCT Filed: Jul. 9, 2012

(86) PCT No.: PCT/CN2012/078365
§ 371 (c)(1),
(2), (4) Date: Apr. 10, 2014

(87) PCT Pub. No.: WO2013/004199
PCT Pub. Date: Jan. 10, 2013

(65) Prior Publication Data
US 2014/0217889 A1 Aug. 7, 2014

(30) Foreign Application Priority Data

| Jul. 7, 2011 | (CN) | 2011 1 0189330 |
| Jul. 7, 2011 | (CN) | 2011 2 0237550 |
| Jul. 7, 2011 | (CN) | 2011 2 0237771 |
| Jul. 7, 2011 | (CN) | 2011 2 0237773 |

(51) Int. Cl.
| *H02J 9/06* | (2006.01) |
| *F21S 9/02* | (2006.01) |
| *F21K 99/00* | (2010.01) |
| *F21V 23/00* | (2006.01) |
| *F21Y 101/02* | (2006.01) |
| *F21V 29/00* | (2006.01) |

(52) U.S. Cl.
CPC .................. *H02J 9/065* (2013.01); *F21S 9/022* (2013.01); *F21K 9/13* (2013.01); *F21K 9/17* (2013.01); *F21V 23/00* (2013.01); *F21Y 2101/02* (2013.01); *F21V 29/2225* (2013.01)
USPC ............................................ 315/86; 315/291

(58) Field of Classification Search
None
See application file for complete search history.

(56) References Cited

U.S. PATENT DOCUMENTS

| 7,812,547 B2 * | 10/2010 | Jaan ............................... 315/291 |
| 7,969,102 B2 * | 6/2011 | Chang ........................... 315/318 |
| 8,362,713 B2 * | 1/2013 | Recker et al. ................. 315/293 |

(Continued)

FOREIGN PATENT DOCUMENTS

| CN | 101182909 A | 5/2008 |
| CN | 101509608 A | 8/2009 |
| CN | 102032521 A | 4/2011 |
| CN | 102278690 A | 12/2011 |
| TW | 201042197 A1 | 12/2010 |
| WO | 2009017709 | 2/2009 |

*Primary Examiner* — Crystal L Hammond
(74) *Attorney, Agent, or Firm* — Kirton McConkie; Evan R. Witt

(57) ABSTRACT

An LED light includes a light body; an LED light board disposed in the light body and disposed thereon a plurality of LED dies; at least one battery coupling member, which is a detachable battery carrier, disposed at an outside edge of the light body for accommodating therein a battery device which is a replaceable element; and a power switch control circuit disposed in the light body and electrically coupled to an alternate current source, the at least one battery coupling member and the LED light board so that either of an alternate current received from the alternate current source and a direct current received from the battery device is transmitted to the LED light board. The replaceable battery device disposed at the outside edge of the light body and used as a backup power supply for emergency illumination is simple in structure and low in cost.

20 Claims, 16 Drawing Sheets

(56) References Cited

U.S. PATENT DOCUMENTS

| | | | |
|---|---|---|---|
| 8,829,799 B2* | 9/2014 | Recker et al. | 315/160 |
| 2002/0140360 A1* | 10/2002 | Crenshaw | 315/149 |
| 2007/0170868 A1* | 7/2007 | Wu | 315/200 A |
| 2009/0206773 A1* | 8/2009 | Chang | 315/297 |
| 2010/0141153 A1* | 6/2010 | Recker et al. | 315/149 |
| 2010/0219775 A1* | 9/2010 | Maglica et al. | 315/362 |
| 2010/0327766 A1* | 12/2010 | Recker et al. | 315/291 |
| 2011/0133655 A1* | 6/2011 | Recker et al. | 315/159 |
| 2011/0254462 A1* | 10/2011 | Ruan et al. | 315/291 |

* cited by examiner

LED LIGHT

TECHNICAL FIELD

The present invention relates to a technical field of LED lighting, and more particularly to an LED light which allows a user to conveniently replace batteries.

PRIOR ART

In prior art, LED lights for providing illumination functions include LED tubes and LED bulbs. Taking an LED bulb for example, it is assembled with a bulb head, a heat dissipater, an LED light board and a light-transmissible bulb housing from top to bottom. The LED light board is disposed with several LED dies. In addition, the LED bulb is disposed with a power control circuit, by which the LED bulb is connected to an electricity supply as the bulb head of the LED bulb is screw-coupled to a light socket and receives power provided by the electricity supply.

However, once the electricity supply is interrupted, no power is available, and then no illumination can be provided by the LED bulb or LED tube. Due to electricity interruption, emergency light may not be provided by general LED bulbs or LED tubes.

On the other hand, an emergency light commonly used in a place such as stairwell or passageway, although equipped with a backup power supply (e.g. battery), has the backup power supply fixed inside the structure of the emergency light. It is thus hard for a user to detach such a fixed backup power supply fixed inside the structure of the emergency light. It is also hard to be conveniently replaced or changed by a user.

SUMMARY

In view of the defects existing in prior art, an objective of the present invention is to provide an LED light, in which a replaceable and exposed battery device is used as a backup power supply for emergency illumination, in order to achieve the purposes of simple structure and low cost.

In view of the defects existing in prior art, another objective of the present invention is to provide an LED light, in which a body sensor is equipped and an exposed battery device is used as a backup power supply for emergency illumination, in order to achieve the purpose of power saving.

In view of the defects existing in prior art, a further objective of the present invention is to provide an LED light including a button switch and a battery device, through which a user may control LED illumination, in order to serve a handheld emergency light during electricity interruption.

In view of the defects existing in prior art, yet another objective of the present invention is to provide an LED light including an earthquake sensor, in order to provide emergency illumination once earthquake happens.

In order to practice the objectives as mentioned above, the technical solution used in the present invention is to provide an LED light, comprising:
a light body;
at least one battery coupling member disposed at an outside edge of the light body for accommodating therein a battery device which has a partial structure exposed outside and is a replaceable element;
a power switch control circuit disposed in the light body for receiving an alternate current from an alternate current source or receiving a direct current from the battery device; and
an LED light board electrically connected to the power switch control circuit and disposed thereon a plurality of LED dies;
wherein if an magnitude of the alternate current is greater than a specific value, the power switch control circuit has the received alternate current enter the LED light board to enable the output of a source light with a first lighting parameter from the LED light, and if the magnitude of the alternate current is less than the specific value, the power switch control circuit has the received direct current enter the LED light board to enable the output of a source light with a second lighting parameter from the LED light.

Preferably, the LED light further comprises a body sensor electrically connected to the power switch control circuit and functioning for sensing whether there is anybody entering a detection zone, wherein when it is detected by the body sensor that somebody enters the detection zone, a body sensing signal is generated and sent to the power switch control circuit to enable the output of the source light with the first lighting parameter from the LED light.

Preferably, when the magnitude of the alternate current is less than the specific value, the power switch control circuit has the received direct current enter the LED light board to enable the constant output of the source light with the second lighting parameter from the LED light.

Preferably, the first lighting parameter is identical to the second lighting parameter, or the first lighting parameter is different from the second lighting parameter.

Preferably, a switch is disposed between the power switch control circuit and the alternate current source, and the magnitude of the alternate current is less than the specific value when the switch is in an off state or the alternate current source is in an interrupted state.

Preferably, the first lighting parameter and the second lighting parameter are a first illuminance and a second illuminance, respectively, or the first lighting parameter and the second lighting parameter are a first color temperature and a second color temperature, respectively.

Preferably, the at least one battery coupling member is a detachable battery carrier or an undetachable battery carrier.

Preferably, the light body is an LED tube and has an accommodation room for accommodating the battery coupling member.

Preferably, the light body is an LED bulb, which includes, from top to bottom, a bulb head, a heat dissipater and a light-transmissible bulb housing, and the at least one battery coupling member is disposed at a side edge of the dissipater and has a part of structure exposed to outside to facilitate replacement of the battery device by user.

Preferably, the power switch control circuit is disposed inside the hear dissipater, and the heat dissipater has an accommodation room at an side edge thereof for accommodating the battery coupling member.

Preferably, the at least one battery coupling member is a detachable battery carrier, the battery device is ring-shaped, and the detachable battery carrier having been mounted thereon the battery device is sleeved around the bulb head by entering from top toward bottom, and disposed on an upper end of the heat dissipater.

The present invention also provides an LED light, which comprises:
a light body;
a battery device, disposed at the light body;
a power switch control circuit disposed in the light body for receiving an alternate current from an alternate current source or receiving a direct current from the battery device;

an LED light board electrically connected to the power switch control circuit and disposed thereon a plurality of LED dies; and a body sensor electrically connected to the power switch control circuit and functioning for sensing whether there is anybody entering a detection zone, wherein when it is detected by the body sensor that somebody enters the detection zone, a body sensing signal is generated and sent to the power switch control circuit;

wherein if an magnitude of the alternate current is greater than a specific value, the power switch control circuit has the received alternate current enter the LED light board to enable the output of a source light with a first lighting parameter from the LED light, and if the magnitude of the alternate current is less than the specific value, the power switch control circuit has the received direct current enter the LED light board to enable the output of a source light with a second lighting parameter from the LED light.

Preferably, when the magnitude of the alternate current is less than the specific value, the power switch control circuit has the received direct current enter the LED light board to enable the constant output of the source light with the second lighting parameter from the LED light.

Preferably, the first lighting parameter is identical to the second lighting parameter, or the first lighting parameter is different from the second lighting parameter.

Preferably, a switch is disposed between the power switch control circuit and the alternate current source, and the magnitude of the alternate current is less than the specific value when the switch is in an off state or the alternate current source is in an interrupted state.

Preferably, the first lighting parameter and the second lighting parameter are a first illuminance and a second illuminance, respectively, or the first lighting parameter and the second lighting parameter are a first color temperature and a second color temperature, respectively.

Preferably, the battery device is a replaceable element.

Preferably, the light body is an LED tube and has an accommodation room for accommodating the battery device.

Preferably, the light body is an LED bulb, which includes, from top to bottom, a bulb head, a heat dissipater and a light-transmissible bulb housing, the power switch control circuit is disposed inside the heat dissipater, and the heat dissipater has at least an accommodation room at an side edge thereof to facilitate the mounting of the battery device therein by a user.

Preferably, the light body is an LED bulb, which includes, from top to bottom, a bulb head, a heat dissipater and a light-transmissible bulb housing, and the battery device is ring-shaped, sleeved around the bulb head by entering from top toward bottom, and disposed on an upper end of the heat dissipater.

The present invention further provides an LED light, which comprises:

a light body;

an LED light board disposed in the light body and disposed thereon a plurality of LED dies;

at least one battery coupling member disposed at an outside edge of the light body for accommodating therein a battery device which is a replaceable element;

a body sensor disposed on the light body and functioning for sensing whether there is anybody entering a detection zone, wherein when it is detected by the body sensor that somebody enters the detection zone, a body sensing signal is generated; and a power switch control circuit disposed in the light body and electrically coupled to an alternate current source, the at least one battery coupling member and the LED light board so that either of an alternate current received from the alternate current source and a direct current received from the battery device is transmitted to the LED light board.

Preferably, the at least one battery coupling member is a detachable battery carrier or an undetachable battery carrier.

Preferably, the battery device is a storage battery, a lithium battery, a dry cell battery, or a rechargeable battery.

Preferably, the power switch control circuit includes a first power input terminal, a second power input terminal and a power output terminal, wherein the first power input terminal is electrically connected to the at least one battery coupling member, the second power input terminal is electrically connected to the alternate current source, and the power output terminal is electrically connected to the LED light board.

Preferably, the light body is an LED tube and has an accommodation room for accommodating the battery coupling member.

Preferably, the LED light body is a cylinder-shaped shell having a light-transmissible lower half, and both ends thereof are disposed with power plug pins electrically connected to the second power input terminal.

Preferably, the at least one battery coupling member is a detachable battery carrier, which is equipped with a power cord, and the accommodation room is equipped with a power connector, wherein when the detachable battery carrier is inserted into the accommodation room, the power connector is electrically connected between the power cord and the first power input terminal; or the detachable battery carrier is equipped with a power pin contact, and the accommodation room is equipped with an electrode socket contact, wherein when the detachable battery carrier is inserted into the accommodation room, the power socket contact is electrically connected between the power pin contact and the first power input terminal.

Preferably, the accommodation room is disposed in an upper half of the light body.

Preferably, the LED light further comprises a cover, which engages with an opening portion of the battery coupling member.

Preferably, the body sensor is disposed at a lower half of the LED light.

Preferably, the light body is an LED light bulb, which includes, from top to bottom, a bulb head, a heat dissipater and a light-transmissible bulb housing, and the battery coupling member is disposed at the heat dissipater.

Preferably, the power switch control circuit is disposed inside the heat dissipater.

Preferably, the heat dissipater is disposed with a plurality of heat-dissipating fins at a side wall thereof.

Preferably, the body sensor is disposed at the bottom of the light-transmitting bulb housing.

Preferably, a bulb head electrode is electrically connected to the second power input terminal.

Preferably, the heat dissipater has an accommodation room at a side edge thereof for accommodating the battery coupling member.

Preferably, the battery coupling member is a detachable battery carrier, which is disposed with a tenon and a positioning slot at the top and the bottom thereof, respectively, and the accommodation room is disposed with a mortise and a positioning piece at the top and the bottom thereof, respectively, wherein the tenon of the detachable battery carrier engages with the mortise of the accommodation room, and the positioning piece is inserted into the positioning slot of the detachable battery carrier.

Preferably, the battery coupling member is a detachable battery carrier, which is equipped with a power pin contact, and the accommodation room is equipped with an electrode socket contact, wherein when the detachable battery carrier is inserted into the accommodation room, the power socket contact is electrically connected between the power pin contact and the first power input terminal.

Preferably, the LED light further comprises a cover, which engages with an opening portion of the battery coupling member.

Preferably, the at least one battery coupling member is a detachable battery carrier, the battery device is ring-shaped, and the detachable battery carrier having been mounted thereon the battery device is sleeved around the bulb head by entering from top toward bottom, and disposed on an upper end of the heat dissipater.

Preferably, the bulb head is disposed with at least one engaging lock at a lower end of the bulb head, and when the detachable battery carrier is sleeved and disposed on the upper end of the heat dissipater, an upper end engaging lock of the detachable battery carrier is locked into the at least one engaging lock so that the lower end of the detachable battery carrier sustains against the upper end of the heat dissipater.

Preferably, the battery coupling member is equipped with a power pin contact, and the accommodation room is equipped with an electrode socket contact, wherein when the detachable battery carrier is inserted into the accommodation room, the power socket contact is electrically connected between the power pin contact and the first power input terminal.

Preferably, the LED light further comprises a button switch provided for a user to control the illumination of the LED light board by way of the button switch.

Preferably, the LED light further comprises a battery circuit board and a hidden battery base, wherein the button switch and the hidden battery base are both connected to and disposed on the battery circuit board, and connected to each other.

Preferably, the LED light further comprises an earthquake sensing module for controlling the illumination of the LED light board while earthquake is happening, wherein the earthquake sensing module is a g-sensor, which has a microelectromechanical chip structure.

According to the present invention, a replaceable and exposed battery device is used as a backup power supply of an LED light to achieve the purposes of simple structure and low cost. Meanwhile, it is convenient for a user to replace and maintain the battery device, and environment-friendly. In addition, a body sensor is used in the present LED light to detect human body in a detection zone, thereby controlling illumination with a power-saving effect. Furthermore, the present LED light can be used as a handheld emergency light by a user during electricity interruption by installing a button switch capable of controlling lighting illuminance. Moreover, the present LED light may provide illumination when earthquake happens by installing an earthquake sensor.

The present invention further provides an LED light, which comprises:
- a bulb head;
- a light-transmissible bulb housing;
- an LED light board disposed thereon a plurality of LED dies;
- a battery coupling member for accommodating therein a battery device which is a replaceable element;
- a heat dissipater disposed between the bulb head and the light-transmissible bulb housing, and disposed with a plurality of heat-dissipating fins at a side wall thereof, wherein an accommodation room is formed between at least two of the heat-dissipating fins for accommodating the battery coupling member; and
- a power switch control circuit disposed in the LED bulb light and electrically connected to an alternate current source, the battery coupling member and the LED light board for receiving and transmitting an alternate current from the alternate current source or receiving a direct current from the battery device to the LED light board.

DESCRIPTIONS OF DRAWINGS

Figure 11:
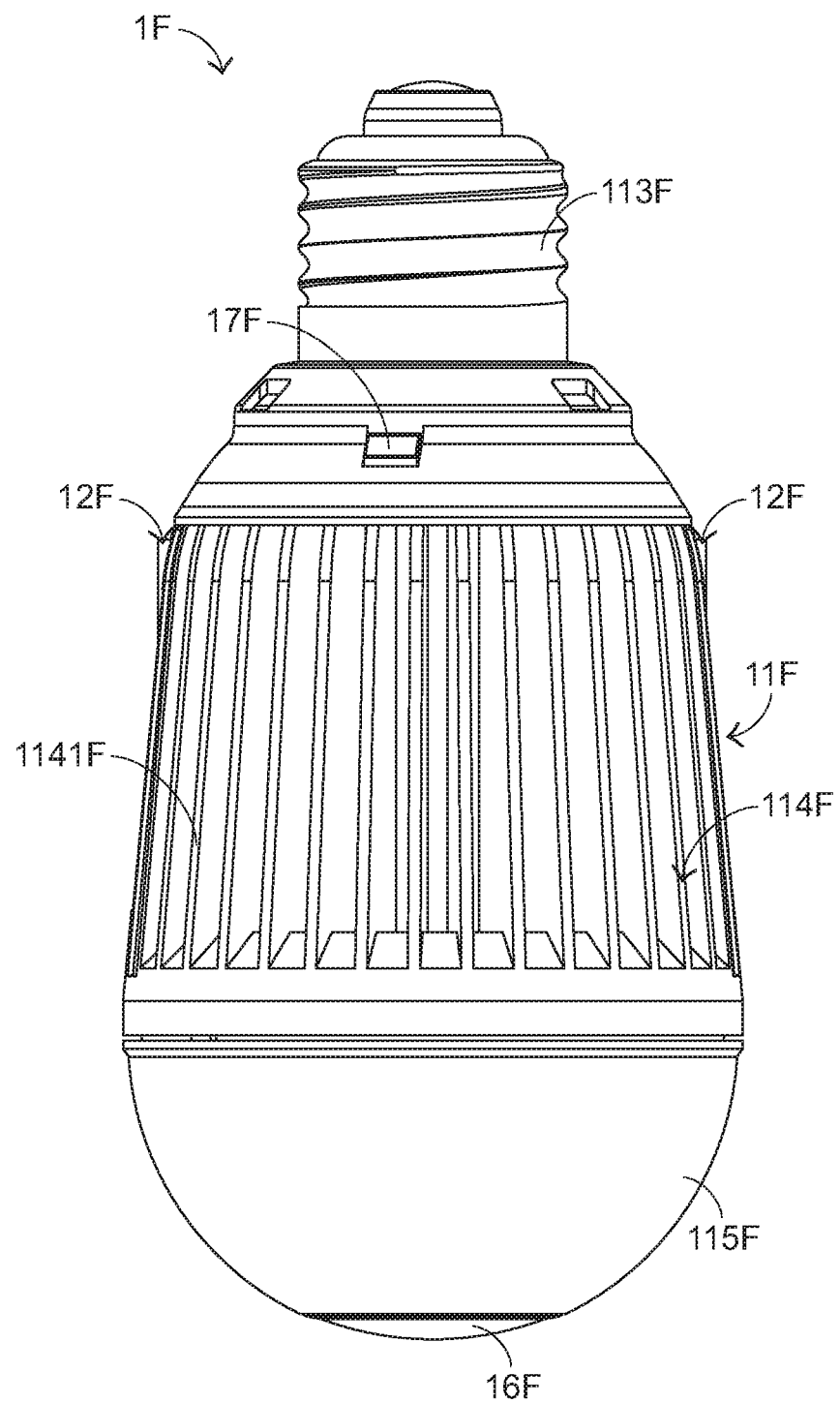
FIG. 11 is a schematic diagram of a structure illustrating an improved structure of an LED light according to a fourth preferred embodied configuration of the present invention.
Figure 12:
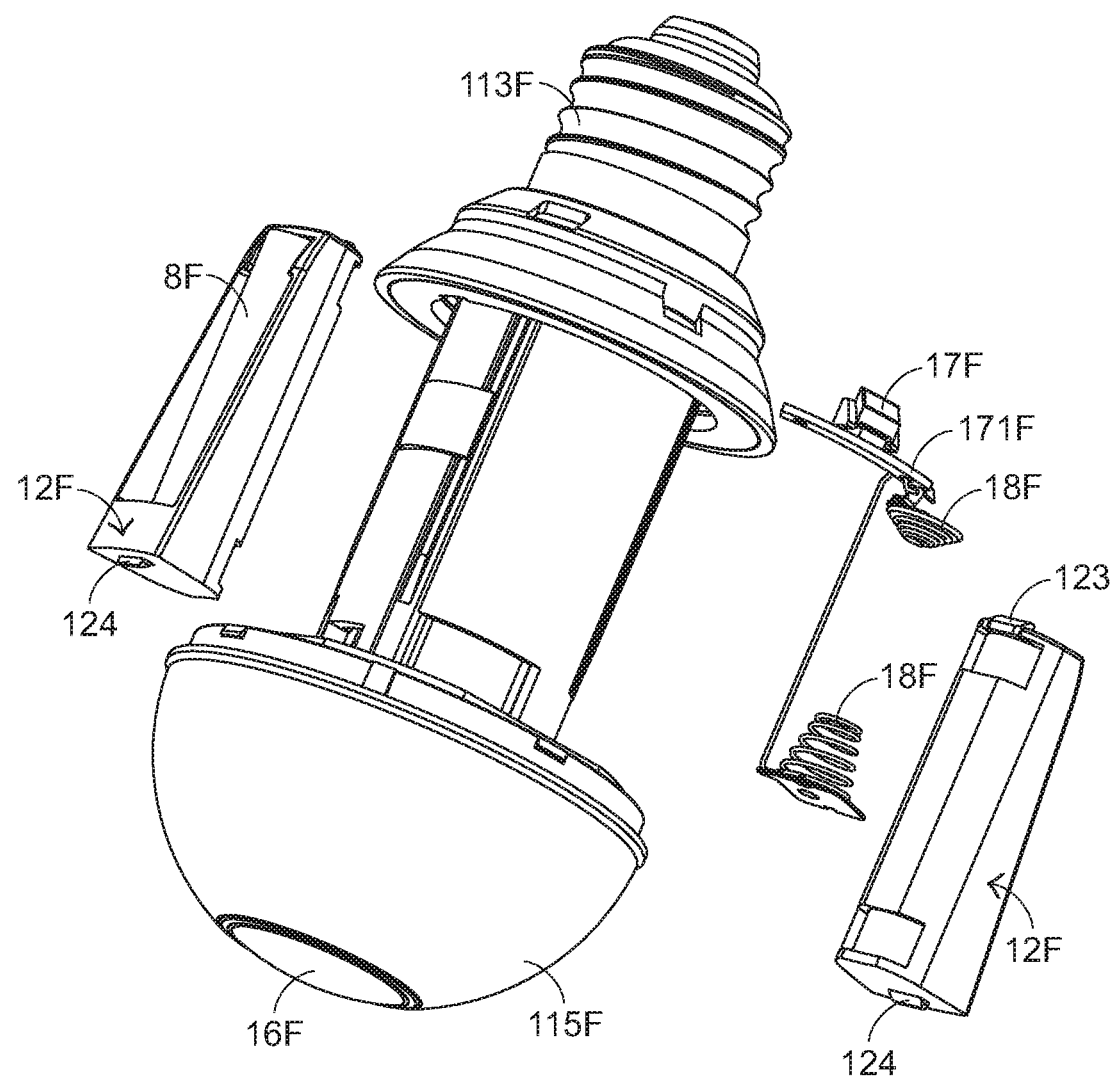
Figure 13:
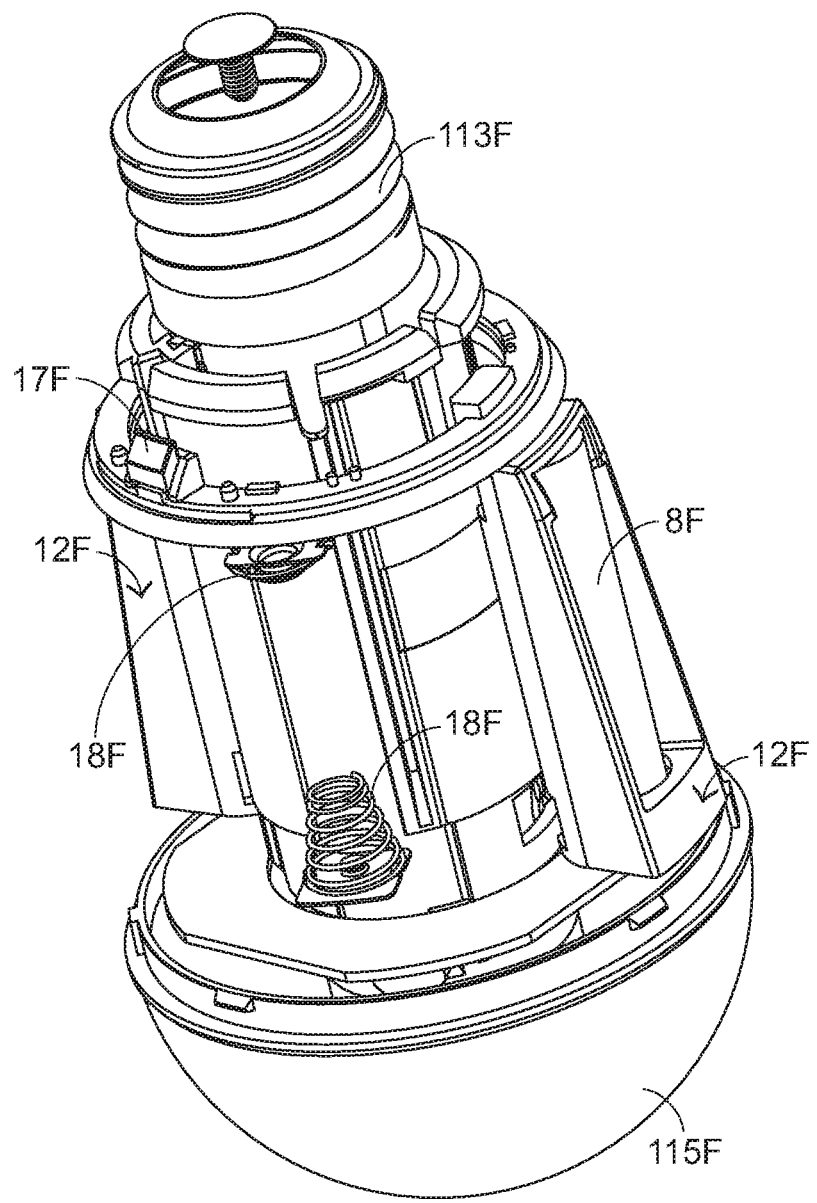
Figure 14:
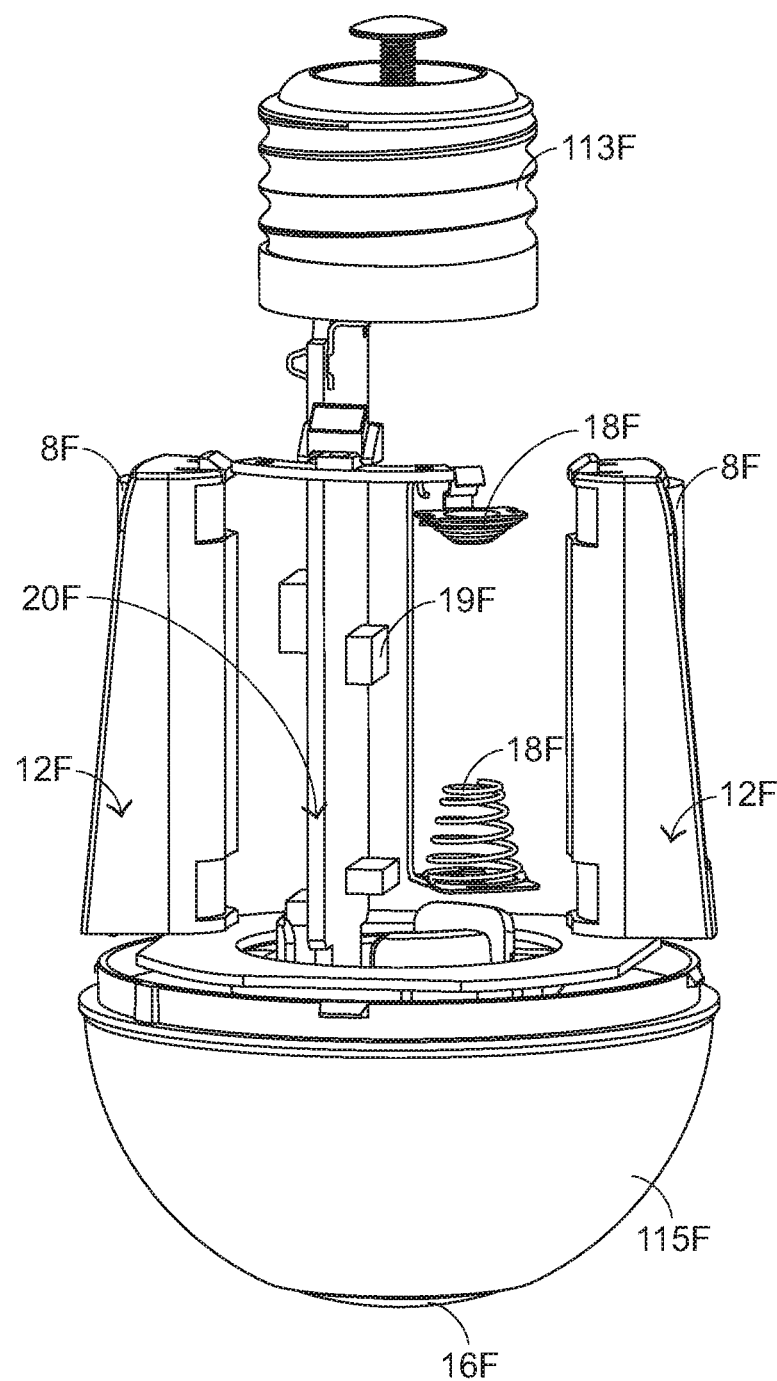

FIGS. 12~14 are exploded views of partial structures of the LED light shown in FIG. 11.

Figure 15:
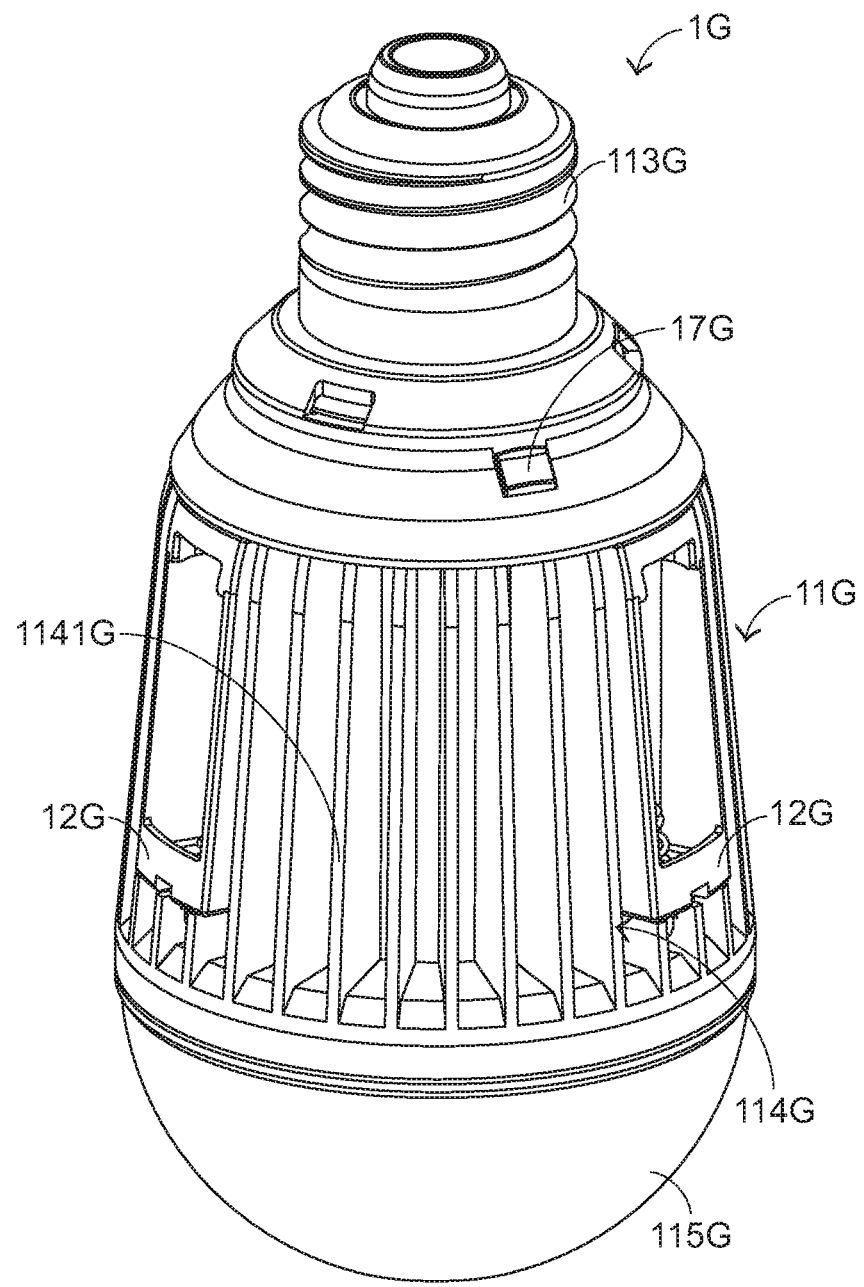

FIG. 15 is a schematic diagram of a structure illustrating an improved structure of an LED light according to a fifth preferred embodied configuration of the present invention.

Figure 16:
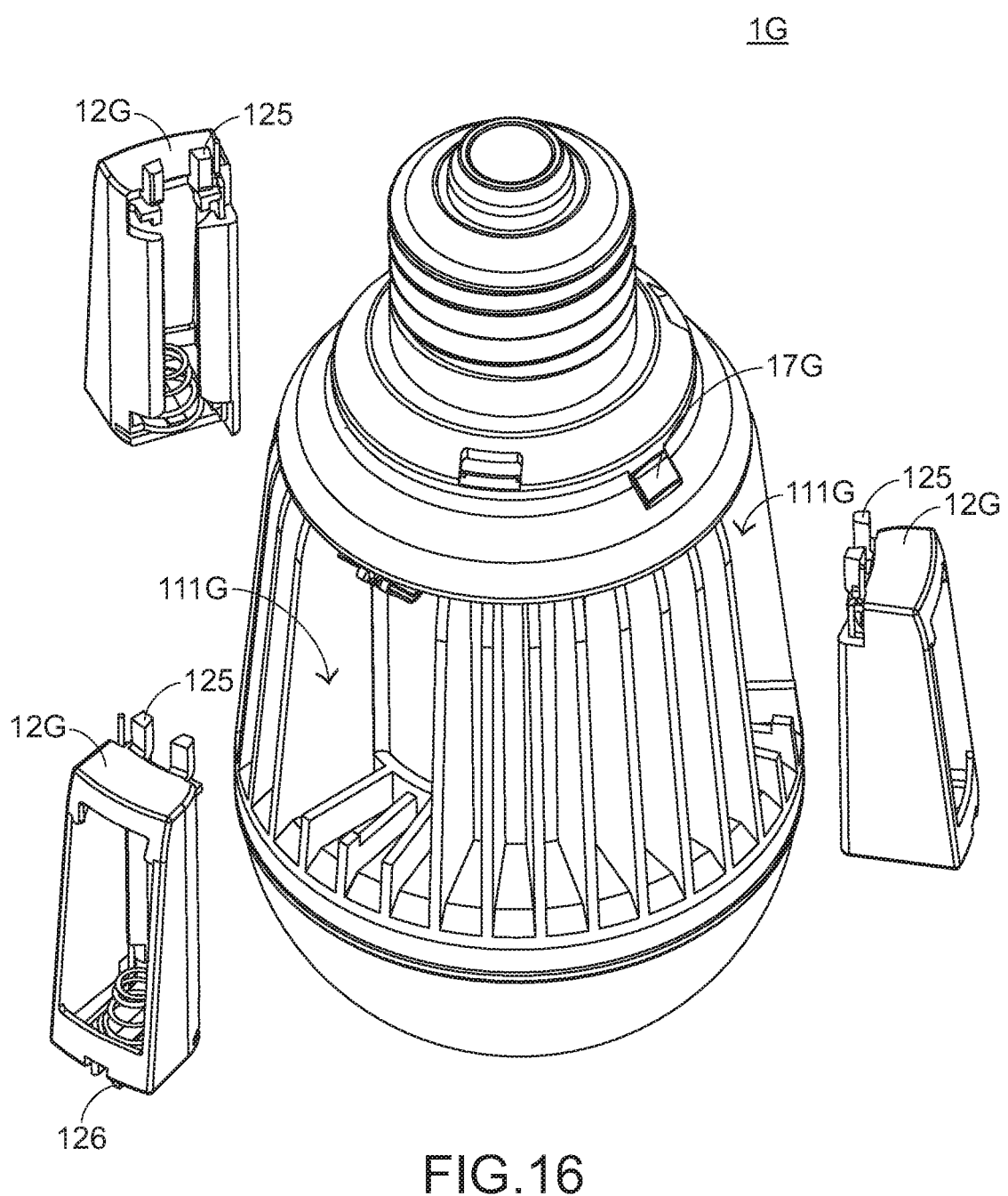

FIG. 16 is an exploded view of the LED light shown in FIG. 15.

DESCRIPTIONS OF PRIMARY ELEMENTS WITH REFERENCE CHARACTERS

LED light 1A, 1B, 1C, 1D, 1E, 1F, 1G
light body 11A, 11B, 11G
LED tube 11C
LED bulb 11D, 11E, 11F
accommodation room 111C, 111D, 111E, 111G
positioning piece 1111
power plug pin 112C
bulb head 113D, 113E, 113F, 113G
engaging lock 1131
heat dissipater 114D, 114E, 114F, 114G
heat-dissipating fin 1141D, 1141E, 1141F, 1141G
light-transmissible bulb housing 115D, 115E, 115F, 115G
battery coupling member 12A, 12B
detachable battery carrier 12C, 12D, 12E, 12F, 12G non-exposed battery carrier 18F
tenon 121, 123, 124, 125, 126
positioning slot 122
power switch control circuit 13A, 13B
first power input terminal 131A, 131B
second power input terminal 132A, 132B
power output terminal 133A, 133B
LED light board 14A, 14B
plural LED dies 15A, 15B
body sensor 16B, 16C, 16D, 16E, 16F
cover 17C
switch 7A, 7B
button switch 17F, 17G
battery circuit board 171F
earthquake sensing module 19
driver circuit board 20F
battery device 8A, 8B, 8C, 8D, 8E, 8F
alternate current source 9A, 9B

EMBODIMENTS

Descriptions hereinafter are only for illustrating preferred embodiments of the present invention, instead of limiting the scope of the present invention.

Figure 1:
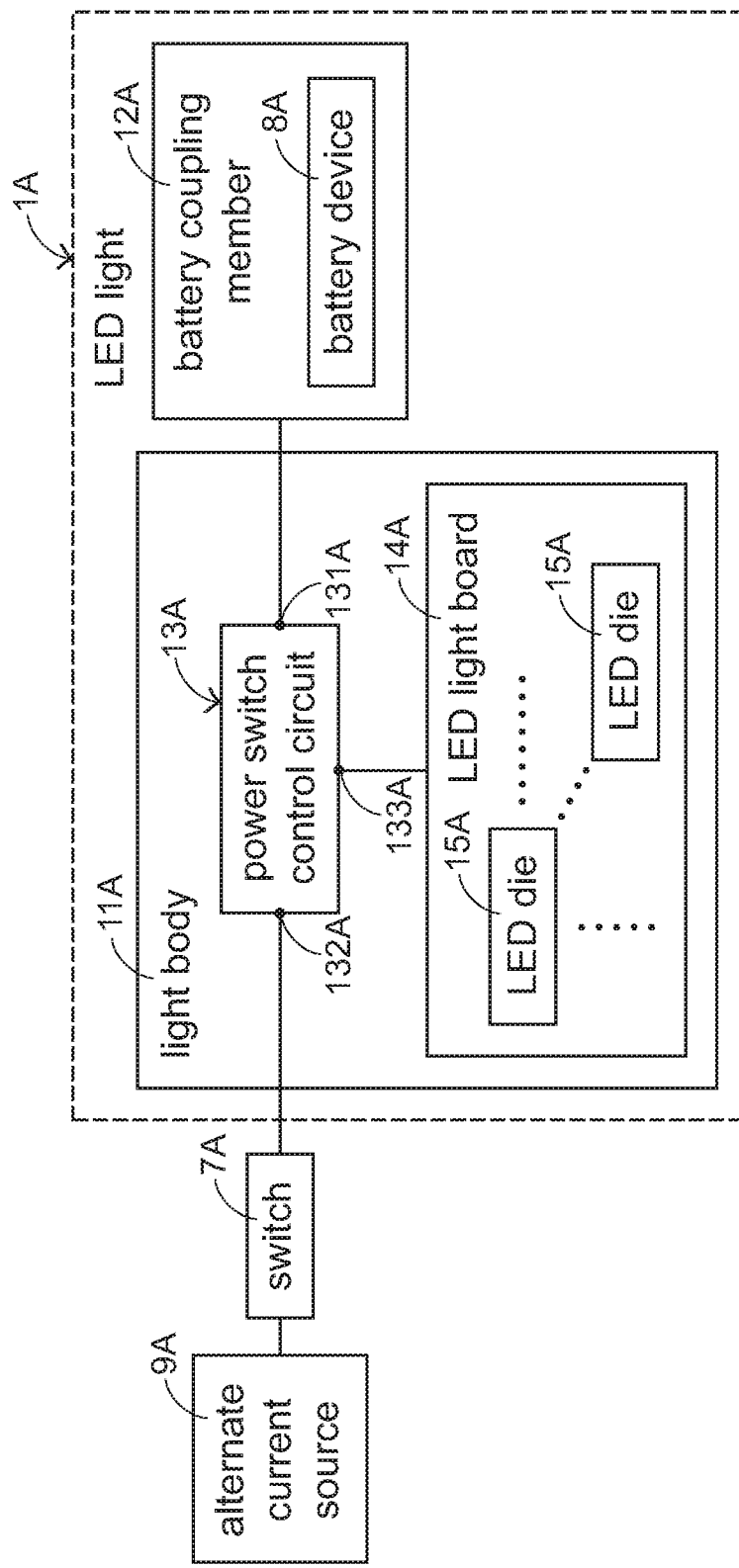
FIG. 1 is a block diagram schematically illustrating the concept of an LED light according to a first preferred embodiment of the present invention.

Please refer to FIG. 1, which is a block diagram schematically illustrating the concept of an LED light according to a first preferred embodiment of the present invention. The LED light 1A includes a light body 11A, a battery coupling member 12A, a power switch control circuit 13A, an LED light board 14A and a plurality of LED dies 15A disposed on the LED light board 14A, wherein the power switch control circuit 13A and the LED light board 14A are disposed in the light body 11A, and the power switch control circuit 13A is electrically connected to an alternate current source 9A, the battery coupling member 12A and the LED light board 14. The battery coupling member 12A is used for accommodating therein a battery device 8A. As such, the alternate current from the alternate current source 9A and the direct current from the battery device 8A can be transmitted to the power switch control circuit 13A, and the power switch control circuit 13A may send one of the alternate current and the direct current to the LED light board 14A, thereby driving the plurality of LED dies 15A on the light board 14A to output source light.

Preferably, the power switch control circuit 13A has a first power input terminal 131A, a second power input terminal 132A, and a power output terminal 133A. The first power input terminal 131A is electrically connected to the battery coupling member 12A; the second power input terminal 132A is electrically connected to the alternate current source 9A, e.g. public electricity supply; and the power output terminal 133A is electrically connected to the LED light board 14A. As such, the direct current from the battery device 8A may sequentially flow through the battery coupling member 12A and the first power input terminal 131A, and then enter power switch control circuit 13A. Then one of the alternate current and the direct current received by the power switch control circuit 13A flows into the LED light board 14A through the power output terminal 133A.

In the present embodiment, when the magnitude of the alternate current received by the power switch control circuit 13A is greater than a specific value, the alternate current received by the power switch control circuit 13A enters the LED light board 14A to enable the output of the source light with a first lighting parameter from the LED light 1A. On the other hand, when the magnitude of the alternate current received by the power switch control circuit 13A is less than the specific value, the direct current received by the power switch control circuit 13A enters the LED light board 14A to enable the output of the source light with a second lighting parameter from the LED light 1A.

Since it is well known to those skilled in the art that the alternate current needs to be rectified and processed into a direct current before flowing into the LED light board 14A, or the alternate current needs to be rectified and processed into a direct current after flowing into the LED light board 14A, in order to drive the output of the source light by the plurality of LED dies 15A on the LED light board 14A, it is not to be redundantly described herein.

In addition, a switch 7A is disposed between the alternate current source 9A and the power switch control circuit 13A for controlling the magnitude of the alternate current. Accordingly, when the switch 7A is in an off state, the magnitude of the alternate current would become very low. In this preferred embodiment, when the switch 7A is in an off state or the alternate current source 9A is interrupted, the magnitude of the alternate current entering the power switch control circuit 13A would be less than the specific value.

Furthermore, in this preferred embodiment, the first lighting parameter and the second lighting parameter are a first illuminance and a second illuminance, respectively, or the first lighting parameter and the second lighting parameter are a first color temperature and a second color temperature, respectively. In more detail, provided that the illuminance of the source light outputted when the LED light 1A is driven by the alternate current and the illuminance of the source light outputted when the LED light 1A is driven by the direct current are different from each other, one of the benefits would be readily realization by a user whether the switch 7A is in an off state or whether alternate current source 9A is in an interrupted state, i.e. whether the LED light 1A is consuming the power of the battery device 8A.

Of course, it is feasible to allow a user to readily distinguish if the LED light 1A is consuming the power of the battery device 8A, as mentioned above, by imparting the source light outputted when the LED light 1A is driven by the alternate current and the source light outputted when the LED light 1A is driven by the direct current with different color temperatures.

The above descriptions are only for illustrating a preferred embodiment, but not intended to limit thereto. For example, the setting of the specific value, or the definition of the first light parameter and the second lighting parameter, can be varied and modified in equivalent ways by those in the art according to practical requirements. The first lighting parameter can be the same as the second lighting parameter. Alternatively, the first lighting parameter can be different from the second lighting parameter.

Figure 2:
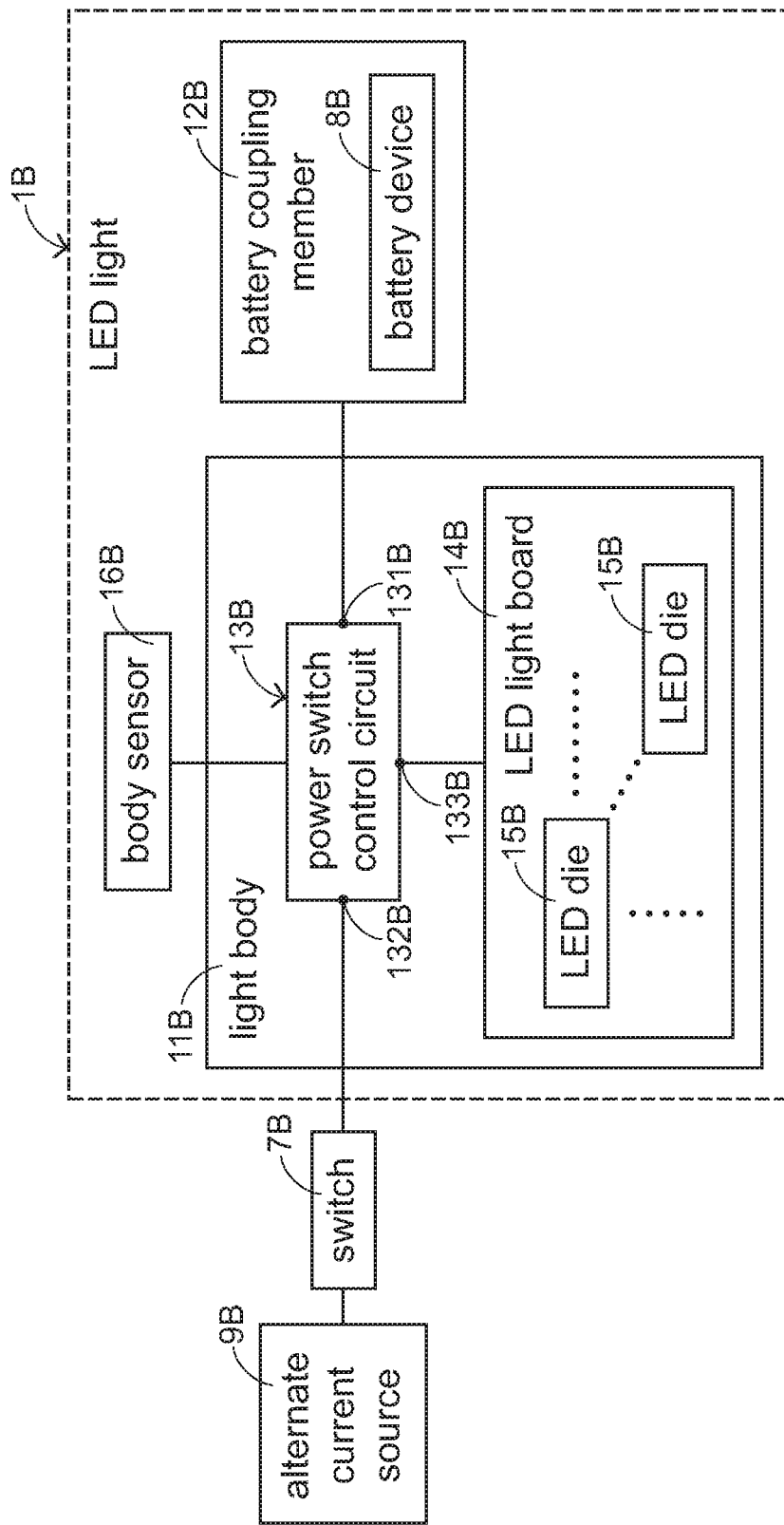
FIG. 2 is a block diagram schematically illustrating the concept of an LED light according to a second preferred embodiment of the present invention.

Please refer to FIG. 2, which is a block diagram schematically illustrating the concept of an LED light according to a second preferred embodiment of the present invention. The LED light 1B is basically similar to that described in the first preferred embodiment of the present invention, and it is not to be redundantly described herein.

This preferred embodiment differs from the first preferred embodiment in that the Led light 1B further includes a body sensor 16B, which is electrically connected to the power switch control circuit 13B, for sensing whether there is anybody present in a detection zone. When it is detected by the body sensor 16B that somebody enters the detection zone, a body sensing signal will be generated and sent to the power switch control circuit 13B. For example, the body sensor 16B may be at least one of an infrared body sensor or a microwave sensor.

This preferred embodiment further differs from the first preferred embodiment in that the power switch control circuit 13B allows the received alternate current to enter the LED light board 14B only on the following two conditions. The first one is that the magnitude of the alternate current received by the power switch control circuit 13B has to be greater than a specific value; and the second one is that the body sensor 16B generates and sends a body sensing signal to the power switch control circuit 13B in response to a detection result showing the presence of somebody in the detection zone.

For example, even if the alternate current source 9B is in a normal power-supply state and the switch 7B is in an on state, the LED light 1B will not output source light if the body sensor 16B does not detect the presence of anybody in the detection zone, in order to save power. On the other hand, once the body sensor 16B detects that somebody enters the detection zone, the LED light 1B will be actuated to output a source light with a first lighting parameter.

If the alternate current source 9B is in an interrupted state, or the switch 7B is in an off state, the power switch control circuit 13B will have the received direct current flow into the LED light board 14B as the magnitude of the received alternate current less than the specific value, so that the LED light 1B is enabled to output a source light with a second lighting parameter.

For facilitating the determination of the off state of the switch 7B and the interruption state of the alternate current source by a user, that is, allowing a user to distinguish whether the LED light 1B is consuming the power of the battery device, the first light parameter can be made different from the second lighting parameter. If the first lighting parameter is the same as the second lighting parameter, then the power switch control circuit 13B has the direct current continuously flow into the LED light board 14B when the alternate current source 9B is in an interrupted state, or the switch 7B is in an off state, thereby allowing the LED light 1B to constantly output the source light.

It is to be described that in the above second preferred embodiment, the battery device 8B may be disposed in the battery coupling member 12B before the LED light 1B leaves the factory so that a user himself cannot detach and replace it. Of course, it is also feasible in the above-described first preferred embodiment and the above-described second preferred embodiment to include only the battery coupling members 12A,12B in the LED light product 1A,1B, while making the battery device 8A,8B a replaceable element. A user himself may dispose the battery device 8A,8B into the battery coupling members 12A,12B of the LED light 1A,1B.

Furthermore, in the above first preferred embodiment and the second preferred embodiment, the battery coupling member 12A,12B may be fixed in the light body 11A,11B before the LED light 1A,1B leaves the factory so that a user himself cannot detach and replace the battery coupling member 12A, 12B, but the user himself may dispose the battery device 8A,8B into the battery coupling members 12A,12B.

Of course, it is also feasible to make the battery coupling members 12A,12B a replaceable element. A user himself may dispose the battery device 8A,8B into the battery coupling members 12A,12B first, and then dispose the assembly into the light body 11A,11B of the LED light 1A,1B.

Accordingly, the present invention further provides a novel and improved structure of an LED light, in which there is accommodation room at an outside edge of the light body 11A,11B for accommodating the battery coupling members 12A,12B and exposing battery coupling members 12A,12B outside the heat-dissipating fins of the light body 11A,11B. In this way, a user may readily insert the battery device 8A,8B into the battery coupling members 12A,12B, or readily detach the battery device 8A,8B from the battery coupling members 12A,12B.

Hereinafter, at least five preferred embodied configurations are given for illustration instead of limiting the scope of the present invention.

Embodied Configuration 1

Figure 3:
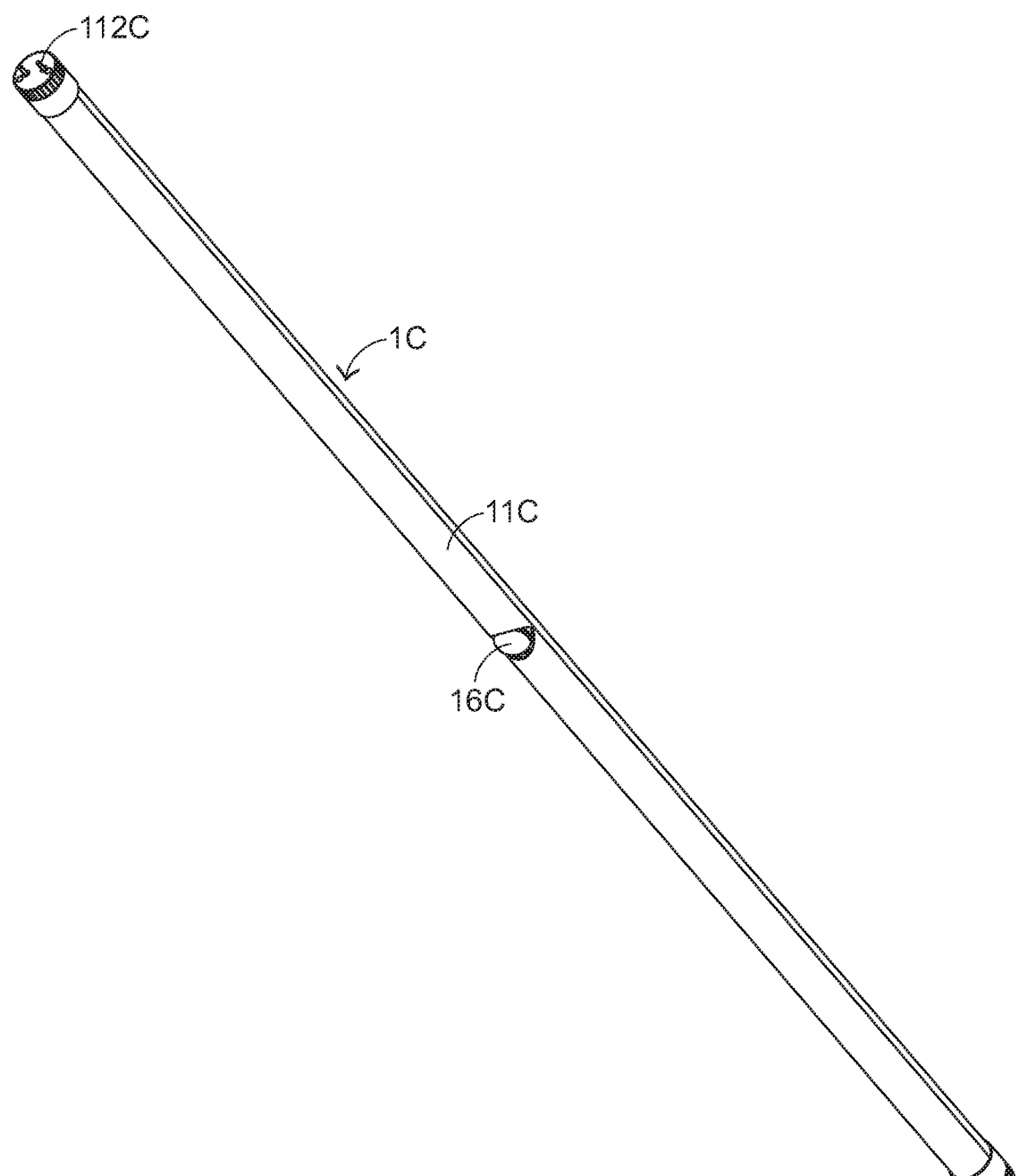
FIG. 3 is a schematic diagram of a structure illustrating an improved structure of an LED light according to a first preferred embodied configuration of the present invention.
Figure 4:
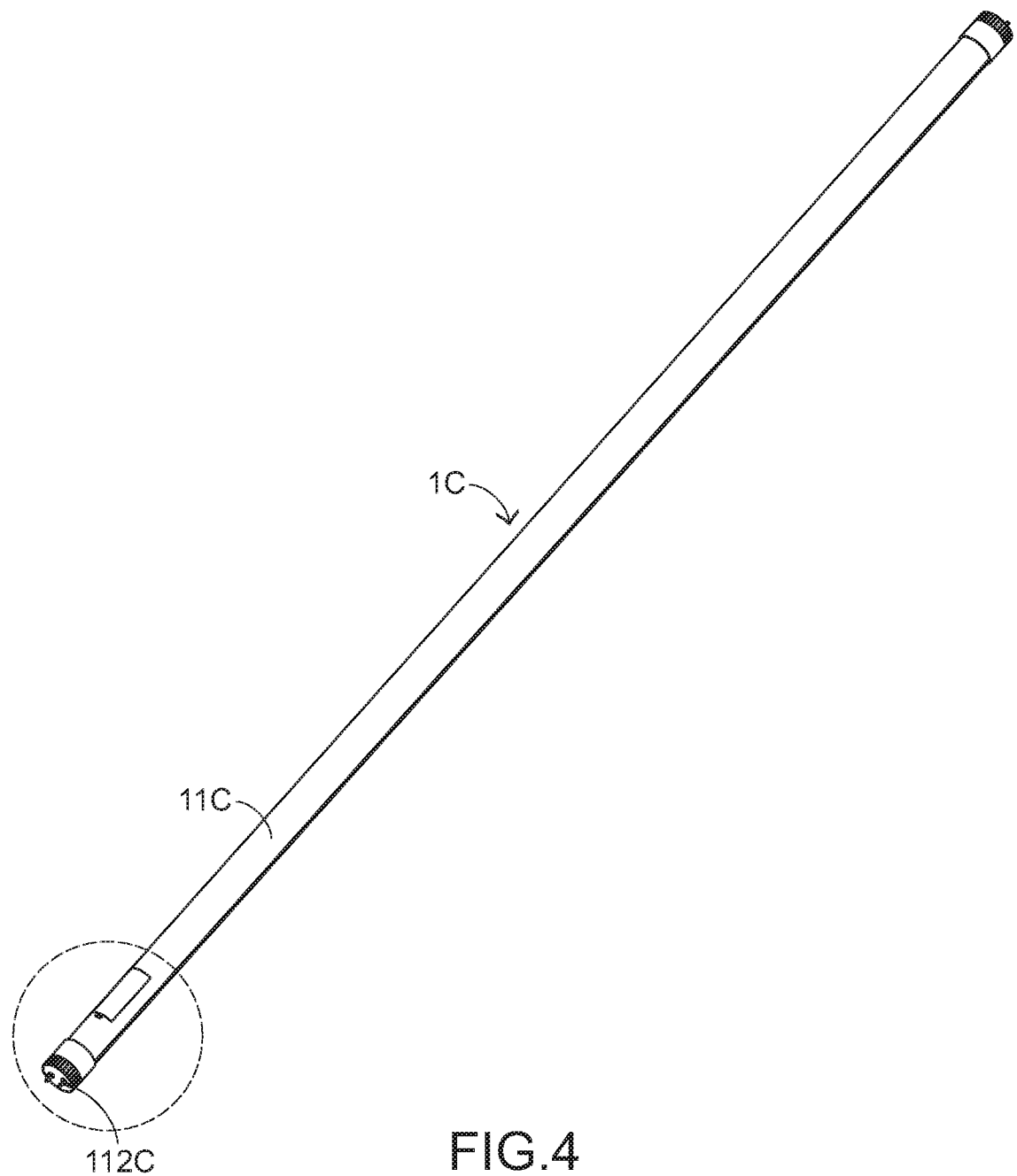
FIG. 4 is a schematic diagram of a structure illustrating the LED light shown in FIG. 3 in another view.
Figure 5:
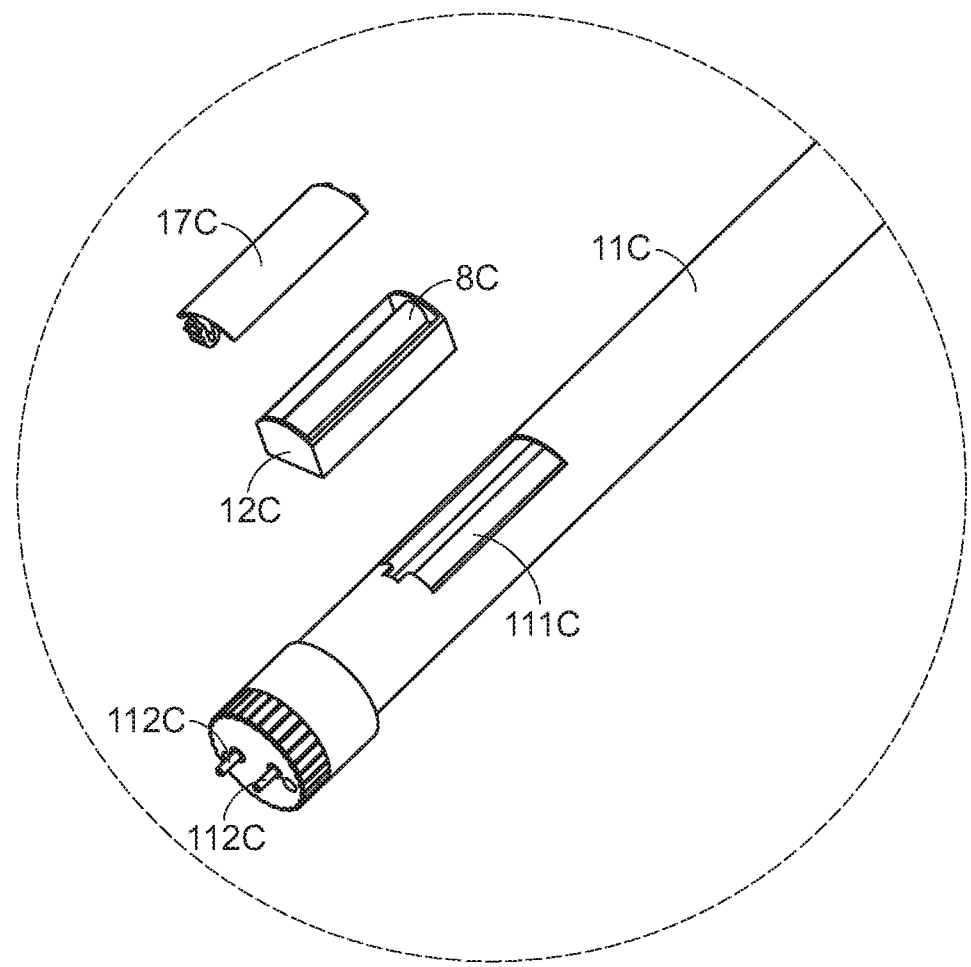
FIG. 5 is an exploded view of a partial structure of the LED light shown in FIG. 3.

Please refer to FIG. 3 through FIG. 5. FIG. 3 is a schematic diagram of a structure illustrating an improved structure of an LED light according to a first preferred embodied configuration of the present invention. FIG. 4 is a schematic diagram of a structure illustrating the LED light shown in FIG. 3 in another view. FIG. 5 is an exploded view of a partial structure of the LED light shown in FIG. 3.

In this embodied configuration, the light body of the LED light 1C is an LED tube 11C, and the battery coupling member is a detachable battery carrier 12C. The LED tube 11C has accommodation room 111C for accommodating the detachable battery carrier 12C. The battery device 8C is disposed in the detachable battery carrier 12C as an emergency backup power supply.

An LED light board (not shown in the figure) is fixed to the LED tube 11C, and both ends of the LED tube 11C are disposed with power plug pins 112C to be plugged into a light socket (not shown in this figure) electrically connected to the alternate current source, e.g. public electricity supply not labelled in this figure but referring to FIG. 1 and FIG. 2. The power switch control circuit (not labelled in this figure but referring to FIG. 1 and FIG. 2) is formed on the LED light board (not labelled in this figure but referring to FIG. 1 and FIG. 2). When the detachable battery carrier 12C is disposed in the accommodation room 111C and the battery device 8C is inserted into the detachable battery carrier 12C, the detachable battery carrier 12C is electrically connected to the power switch control circuit so as to electrically connect the battery device 8C to a first power input terminal of the power switch control circuit (not labelled in this figure but referring to FIG. 1 and FIG. 2).

On the other hand, a second power input terminal of the power switch control circuit (not labelled in this figure but referring to FIG. 1 and FIG. 2) is electrically connected to the power plug pins 112C, and a power output terminal of the power switch control circuit (not labelled in this figure but referring to FIG. 1 and FIG. 2) is electrically connected to the LED light board. The power switch control circuit is used for switching the connection to either the first power input terminal or the second power input terminal so as to connect to the corresponding alternate current source, e.g. public electricity supply, or battery device 8C.

When the alternate current source, e.g. public electricity supply, is available, the power switch control circuit is connected to the alternate current source, e.g. public electricity supply, via the second power input terminal. Meanwhile, alternate current source, e.g. public electricity supply, supplies electricity to the LED tube 11C to provide illumination without using the electric power of the battery device 8C. On the other hand, when the alternate current source, e.g. public electricity supply, is interrupted or the switch (not labelled in this figure but referring to FIG. 1 and FIG. 2) is in an off state, the power switch control circuit is connected to the battery device 8C via the first power input terminal. Meanwhile, the battery device 8C supplies electricity to the LED tube 11C to provide emergency illumination.

In this embodied configuration, the battery device 8C is a replaceable element. That is, it can be conveniently detached from the detachable battery carrier 12C of the LED tube 11C, and can be conveniently inserted into the detachable battery carrier 12C of the LED tube 11C. It is thus convenient for a user to replace and maintain. In addition, due to easy detachment of the battery device 8C to be separated and recycled, it facilitates recycling for environmental protection. Moreover, the battery device 8C can be a storage battery, a lithium battery, a dry cell battery, or a rechargeable battery. The battery device 8C is highly general for easy maintenance and replacement.

In this embodied configuration, the LED tube 11C is cylinder-shaped, and a lower half thereof is a light-transmissible shell, which allows the source light provided by a plurality of LED dies on the LED light board (not labelled in this figure but referring to FIG. 1 and FIG. 2) to be emitted out. Furthermore, the accommodation room 111C is disposed on an upper half of the LED tube 11C. Preferably, the LED light 1C further includes a cover 17C. The cover 17C engages with an opening portion of the detachable battery carrier 12C so that the LED tube 11C may reserve its original appearance without changing the light socket of the LED tube 11C and associated equipment to achieve the purpose of protecting the battery device when the battery device 8C is accommodated in the detachable battery carrier 12C.

The detachable battery carrier 12C is equipped with a power cord (not labelled in this figure), and the accommodation room 111C is equipped with a power connector (not labelled in this figure), which is electrically connected to the first power input terminal of the power switch control circuit. Therefore, when the detachable battery carrier 12C is inserted into the accommodation room 111C, the power cord will be inserted to contact with the power connector so that the detachable battery carrier 12C is electrically connected to the first power input terminal of the power switch control circuit.

Alternatively, the detachable battery carrier 12C is equipped with a power pin contact (not labelled in this figure), and the accommodation room 111C is equipped with an electrode socket contact (not labelled in this figure), which is electrically connected to the first power input terminal of the power switch control circuit. Therefore, when the detachable battery carrier 12C is inserted into the accommodation room 111C, the power pin contact will contact with the electrode socket contact so that the detachable battery carrier 12C is electrically connected to the first power input terminal of the power switch control circuit.

Furthermore, the body sensor 16C of the LED light 1C is fixed in a lower half of the LED tube 11C, at a middle position or a side position. The body sensor 16C functions for sensing whether there is anybody entering a detection zone. When it is detected that somebody enters the detection zone, a body sensing signal is generated and sent to the power switch control circuit to enable the LED tube 11C to provide illumination. For example, the body sensor 16C in this embodiment may be an infrared body sensor. Alternatively, a microwave sensor may be used in lieu of the aforementioned infrared body sensor.

It is to be noted that the above descriptions are only for illustrating one practically embodied configuration, wherein the battery coupling member may also be an undetachable battery carrier. For example, the light body (LED tube) is integrally formed with the battery coupling member (undetachable battery carrier), so a user himself may not take the battery coupling member out of the light body. Nevertheless, a user may still conveniently take the battery device out of the above-mentioned undetachable and partially exposed battery carrier.

Embodied Configuration 2

Figure 6:
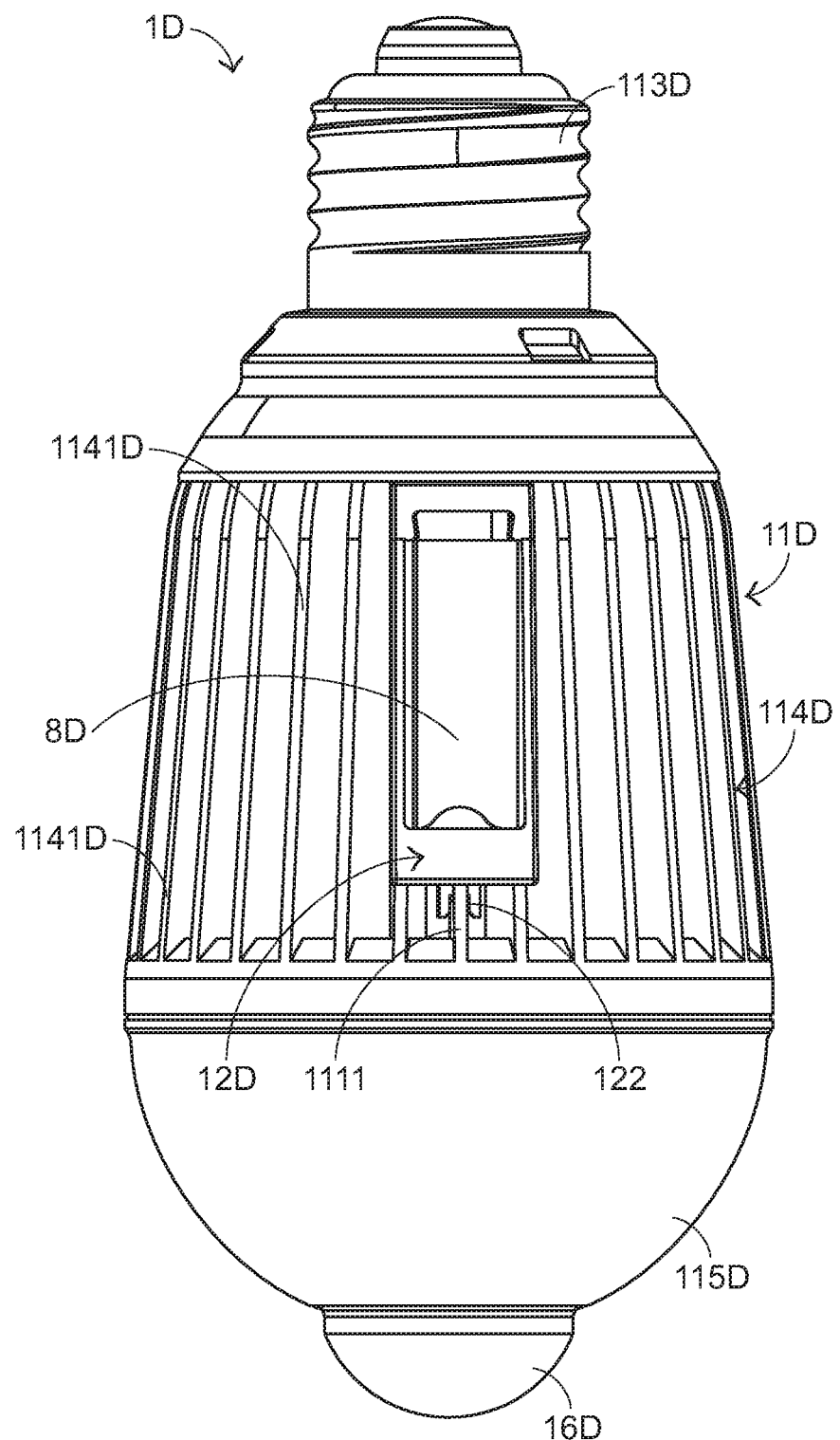
FIG. 6 is a schematic diagram of a structure illustrating an improved structure of an LED light according to a second preferred embodied configuration of the present invention.

Please refer to FIG. 6, which is a schematic diagram of a structure illustrating an improved structure of an LED light according to a second preferred embodied configuration of the present invention. In this embodied configuration, the light body of the LED light 1D is an LED bulb 11D, which includes, from top to bottom, a bulb head 113D, a heat dissipater 114D and a light-transmissible bulb housing 115D. The LED light board (not labelled in this figure but referring to FIG. 1 and FIG. 2) and the power switch circuit board (not labelled in this figure but referring to FIG. 1 and FIG. 2) are disposed in the LED bulb. The bulb head 113D is used to be plugged into a light socket (not labelled in this figure) electrically connected to an alternate light source, e.g. a public electricity supply (not labelled in this figure but referring to FIG. 1 and FIG. 2). Preferably, the heat dissipater 114D is disposed with a plurality of heat-dissipating fins 1141D at a side wall thereof, and has an accommodation chamber (not labelled in this figure) for accommodating the power switch circuit board therein.

The heat dissipater 114D has an accommodation room 111D at a side wall thereof (see FIG. 8) for accommodating a battery coupling member. The battery coupling member is a detachable battery carrier 12D for disposing therein a battery device 8D in order to provide emergency backup power. The detachable battery carrier 12D is partially exposed outside the heat dissipater 114D so that the battery device 8D mounted in the detachable battery carrier 12D is also exposed so as to facilitate replacement by a user.

In this embodied configuration, there are three accommodation rooms 111D evenly distributed on the side wall of the heat dissipater 114D for accommodating three detachable battery carriers 12D, respectively. Of course, the amount of the accommodation rooms 111D and the amount of the detachable battery carriers 12D are not limited to three, and instead, it can be varied or designed equivalently by those skilled in the art according to practical applications and requirements.

Furthermore, as shown in FIG. 6, when the detachable battery carrier 12D is disposed in the accommodation room 111D, and the battery device 8D is inserted into the detachable battery carrier 12D, the detachable battery carrier 12D is electrically connected to the power switch control circuit so that the battery device 8D is electrically connected to a first power input terminal of the power switch control circuit (not labelled in this figure but referring to FIG. 1 and FIG. 2).

The bulb head 113D is equipped with a bulb head electrode (not labelled in this figure), and electrically connected to the second power input terminal (not labelled in this figure but referring to FIG. 1 and FIG. 2). The power output terminal of the power switch control circuit (not labelled in this figure but referring to FIG. 1 and FIG. 2) is electrically connected to an LED light board. The power switch control circuit is used for switching the conduction to the first power input terminal or the second power input terminal to connect to the corresponding alternate light source, e.g. a public electricity supply, or the battery device 8D.

When the alternate current source, e.g. public electricity supply, is available, the power switch control circuit is connected to the alternate current source, e.g. public electricity supply, via the second power input terminal. Meanwhile, alternate current source, e.g. public electricity supply, supplies electricity to the LED bulb 11D to provide illumination without using the electric power of the battery device 8D. On the other hand, when the alternate current source, e.g. public electricity supply, is interrupted or the switch (not labelled in this figure but referring to FIG. 1 and FIG. 2) is in an off state, the power switch control circuit is connected to the battery device 8D via the first power input terminal. Meanwhile, the battery device 8D supplies electricity to the LED bulb 11D to provide emergency illumination.

Figure 7:
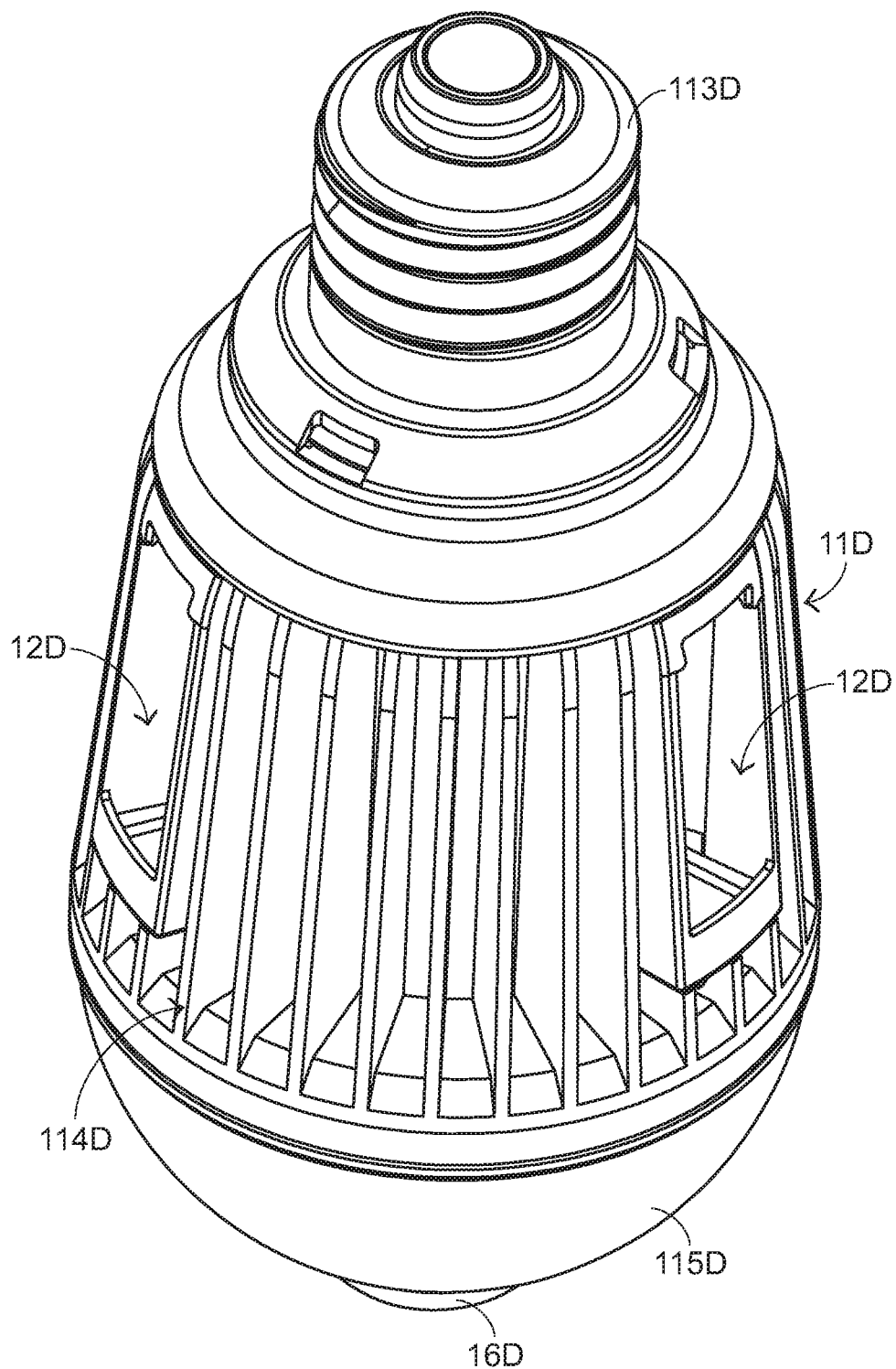
FIG. 7 is a schematic diagram illustrating a state of the LED light shown in FIG. 6, from which the battery devices are detached.

In this embodied configuration, the battery device 8D is a replaceable element. Please refer to FIG. 7, which is a schematic diagram illustrating a state of the LED light shown in FIG. 6, from which the battery devices are detached. It is illustrated in FIG. 7 that the battery device 8D can be conveniently detached from the detachable and exposed battery carrier 12D, and can be conveniently inserted into the detachable battery carrier 12D. It is thus convenient for a user to replace and maintain. In addition, due to exposure and easy detachment of the battery device 8D to be separated and recycled, it facilitates recycling for environmental protection. Moreover, the battery device 8D can be a storage battery, a lithium battery, a dry cell battery, or a rechargeable battery. The battery device 8D is highly general for easy maintenance and replacement.

Preferably, the LED light 1D further includes a cover (not labelled in this figure). The cover engages with an opening portion of the detachable battery carrier 12D so that the LED bulb 11D may reserve its original appearance while protecting the battery device 8D.

Figure 8:
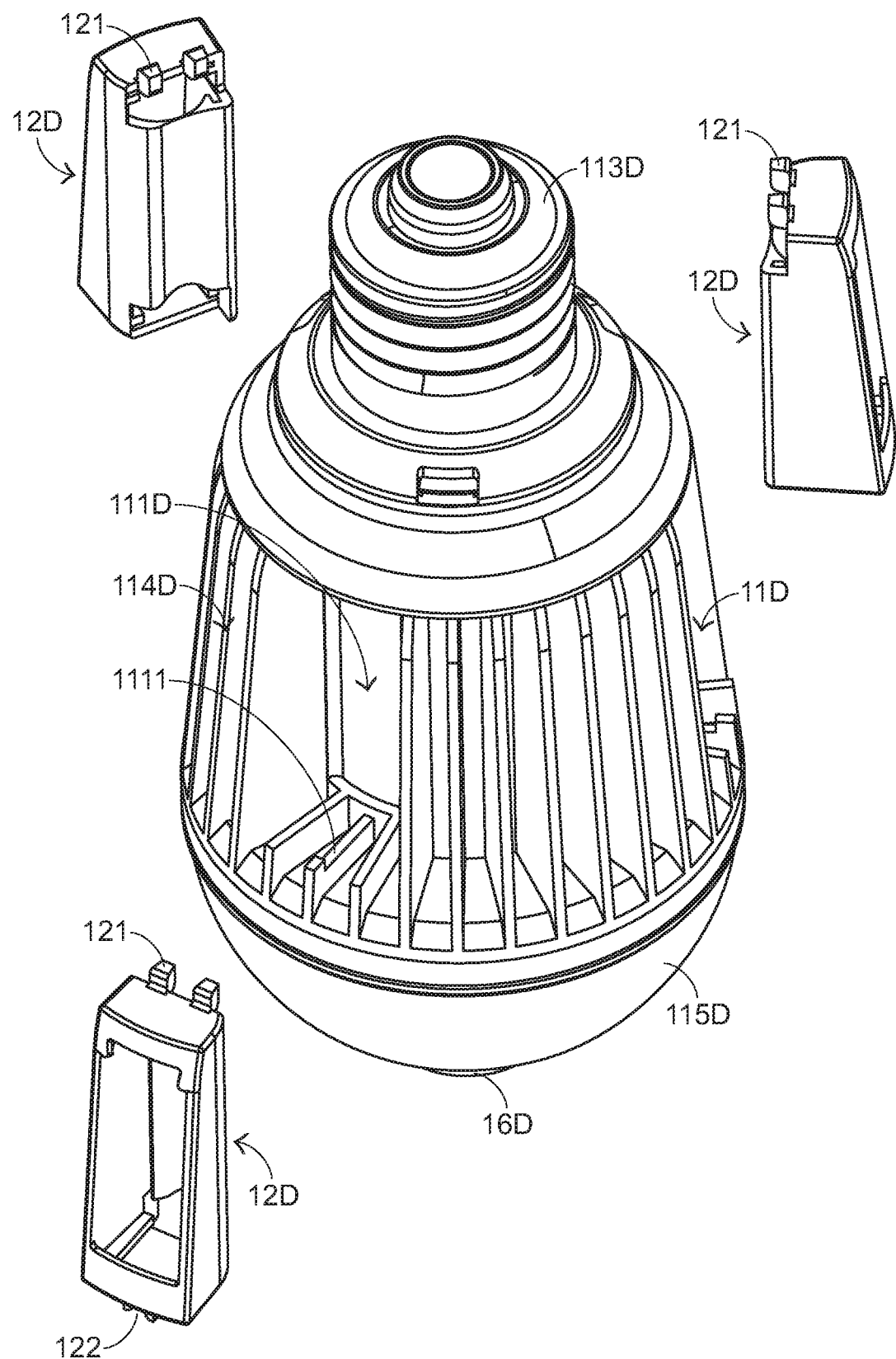
FIG. 8 is a schematic diagram illustrating a state of the LED light shown in FIG. 6, from which the detachable battery carriers are detached.

Please refer to FIG. 8, which is a schematic diagram illustrating a state of the LED light shown in FIG. 6, from which the detachable battery carriers are detached. The detachable battery carrier 12D is disposed with a tenon 121 at the top and a positioning slot at the bottom, and the accommodation room 111D is disposed with a mortise (not labelled in this figure) at the top and a positioning piece 1111 at the bottom, wherein the tenon 121 of the detachable battery carrier 12D engages with the mortise of the accommodation room 111D, and the positioning piece 1111 is inserted into the positioning slot 122 of the detachable battery carrier 12D.

The detachable battery carrier 12D is further equipped with a power pin contact (not labelled in this figure), and the accommodation room 111D is equipped with an electrode socket contact (not labelled in this figure), which is electrically connected to the first power input terminal of the power switch control circuit. Therefore, when the detachable battery carrier 12D is inserted into the accommodation room 111D, the power pin contact will contact with the electrode socket contact so that the detachable battery carrier 12D is electrically connected to the first power input terminal of the power switch control circuit. Therefore, it is easily assembled and conveniently connected.

The body sensor 16D of the LED light 1D, which is bump-shaped, is disposed at bottom of the light-transmissible bulb housing 115D. The body sensor 16D is used for sensing whether there is anybody entering a detection zone. When it is detected by the body sensor 16D that somebody enters the detection zone, a body sensing signal is generated and sent to the power switch control circuit for enabling the LED bulb 11D to provide illumination. For example, the body sensor 16D in this embodiment may be an infrared body sensor. Alternatively, a microwave sensor may be used in lieu of the aforementioned infrared body sensor.

It is to be noted that the above descriptions are only for illustrating one practically embodied configuration, wherein the battery coupling member may also be an undetachable battery carrier. For example, the light body (LED bulb) is integrally formed with the battery coupling member (undetachable battery carrier), so the battery coupling member cannot be taken out of the light body. Nevertheless, a user may still conveniently take the battery device out of the above-mentioned undetachable and partially exposed battery carrier.

Embodied Configuration 3

Figure 9:
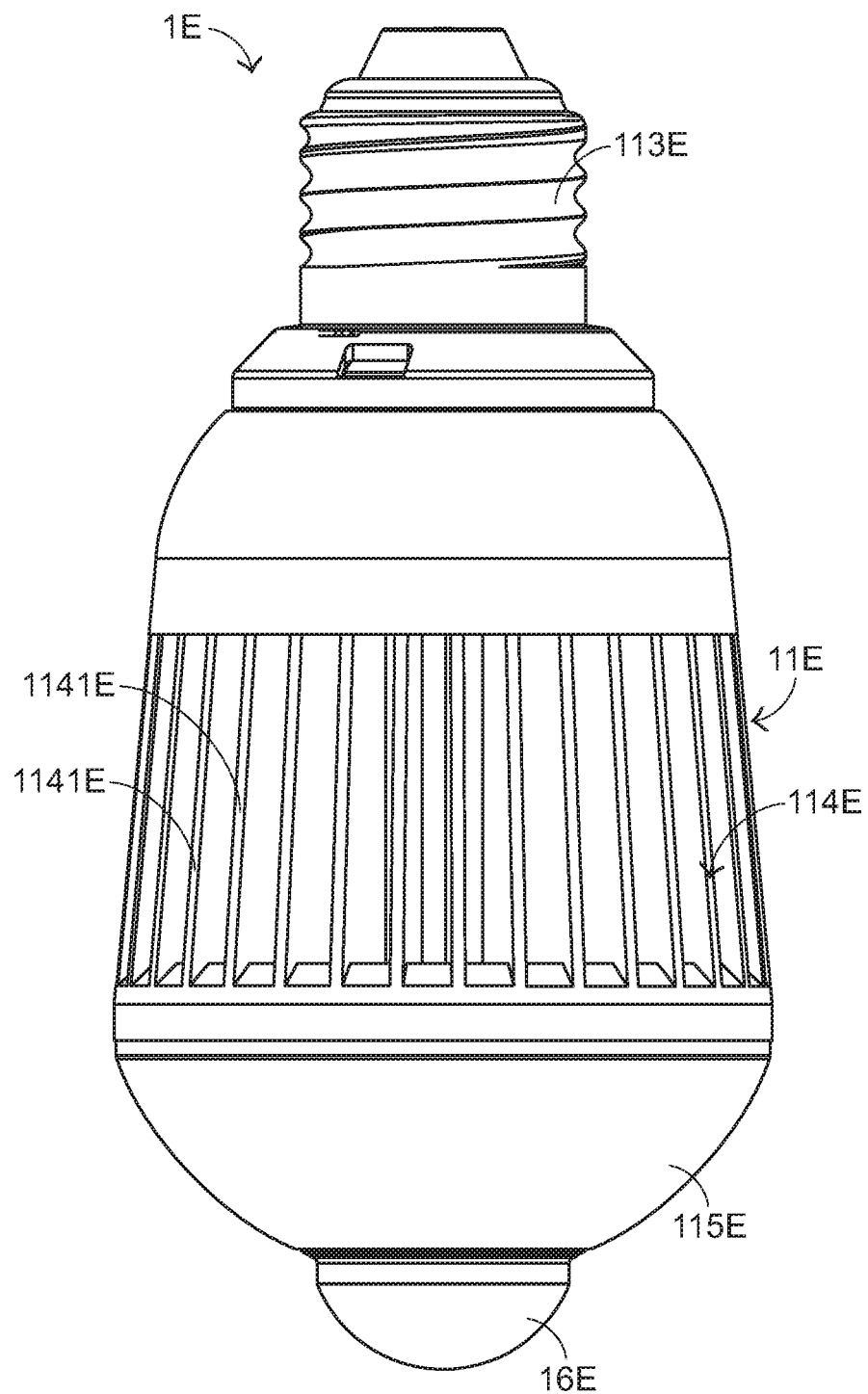
FIG. 9 is a schematic diagram of a structure illustrating an improved structure of an LED light according to a third preferred embodied configuration of the present invention.
Figure 10:
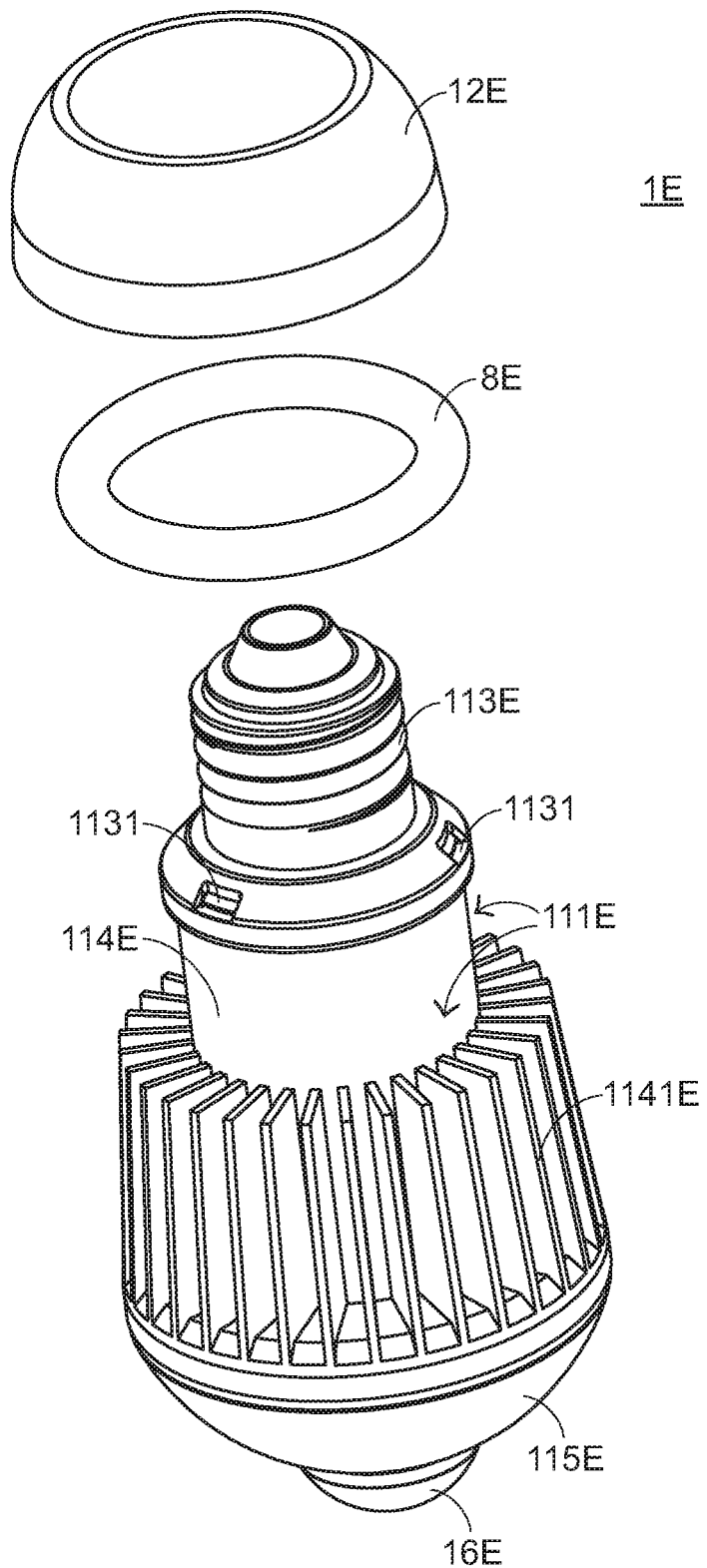
FIG. 10 is an exploded view of the LED light shown in FIG. 9.

Please refer to FIG. 9 and FIG. 10. FIG. 9 is a schematic diagram of a structure illustrating an improved structure of an LED light according to a third preferred embodied configuration of the present invention. FIG. 10 is an exploded view of the LED light shown in FIG. 9. In this embodied configuration, the light body of the LED light 1E is an LED bulb 11E, which includes, from top to bottom, a bulb head 113E, a heat dissipater 114E and a light-transmissible bulb housing 115E. The LED light board (not labelled in this figure but referring to FIG. 1 and FIG. 2) and the power switch circuit board (not labelled in this figure but referring to FIG. 1 and FIG. 2) are disposed in the LED bulb 11E. The bulb head 113E is used to be plugged into a light socket (not labelled in this figure) electrically connected to an alternate light source, e.g. a public electricity supply (not labelled in this figure but referring to FIG. 1 and FIG. 2). Preferably, the heat dissipater 114E is disposed with a plurality of heat-dissipating fins 1141E at a side wall thereof, and has an accommodation chamber (not labelled in this figure) for accommodating the power switch circuit board therein.

The heat dissipater 114E has an accommodation room 111E at a side wall of its top portion for accommodating a battery coupling member. In this embodied configuration, the battery coupling member is a detachable battery carrier 12E for disposing therein a battery device 8E in order to provide emergency backup power. When the battery device 8E is disposed in the detachable battery carrier 12E, the detachable battery carrier 12E is sleeved around the bulb head 113 by entering from top toward bottom, and disposed on an upper end of the heat dissipater 114E, so as to be disposed in the accommodation room 111E.

When the detachable battery carrier 12E is disposed in the accommodation room 111E and the battery device 8E is disposed in the inner side of the detachable battery carrier 12E, the detachable battery carrier 12E is electrically connected to the power switch control circuit so as to have the battery device 8E electrically connected to the first power input terminal of the power switch control circuit.

The bulb head 113E is equipped with a bulb head electrode (not labelled in this figure), and electrically connected to the second power input terminal. The power output terminal of the power switch control circuit is electrically connected to an LED light board. The power switch control circuit is used for switching the conduction to the first power input terminal or the second power input terminal to connect to the corresponding alternate light source, e.g. a public electricity supply, or the battery device 8E.

When the alternate current source, e.g. public electricity supply, is available, the power switch control circuit is connected to the alternate current source, e.g. public electricity supply, via the second power input terminal. Meanwhile, alternate current source, e.g. public electricity supply, supplies electricity to the LED bulb 11E to provide illumination without using the electric power of the battery device 8E. On the other hand, when the alternate current source, e.g. public electricity supply, is interrupted or the switch (not labelled in this figure but referring to FIG. 1 and FIG. 2) is in an off state, the power switch control circuit is connected to the battery device 8E via the first power input terminal. Meanwhile, the battery device 8E supplies electricity to the LED bulb 11E to provide emergency illumination.

In this embodied configuration, the battery device 8E is ring-shaped is a replaceable element, which can be conveniently detached from the detachable battery carrier 12E, and conveniently inserted into the detachable battery carrier 12E. It is thus convenient for a user to replace and maintain. In addition, due to easy detachment of the battery device 8E to be separated and recycled, it facilitates recycling for environmental protection. Moreover, the battery device 8E can be a storage battery, a lithium battery, a dry cell battery, or a rechargeable battery. The battery device 8E is highly general for easy maintenance and replacement.

Furthermore, in this embodied configuration, the bulb head 113E is disposed with at least one engaging lock 1131 at a lower end of the bulb head 113E. When the detachable battery carrier 12E is disposed in the accommodation room 111E, the upper end of the detachable battery carrier 12E engages with the at least one engaging lock 1131 at the lower end of the bulb head 113E, and the lower end of the detachable battery carrier 12E urges against the upper end of the heat dissipater 114E. Therefore, the detachable battery carrier 12E can be fixed in the accommodation room 111E at the upper end of the heat dissipater 114E.

If the detachable battery carrier 12E is to be detached from the LED bulb 11E, the upper end of the detachable battery carrier 12E can be escaped from the engaging lock 1131 at the lower end of the bulb head 113E by simply pushing the detachable battery carrier 12E upwards. Then it is able to take the detachable battery carrier 12E out. It is understood that the assembling and detachment of the detachable battery carrier 12E are simple, convenient and quick, and it is able to readily replace the battery device 8E of the LED bulb 11E.

The detachable battery carrier 12E is further equipped with a power pin contact (not labelled in this figure), and the accommodation room 111E is equipped with an electrode socket contact (not labelled in this figure), which is electrically connected to the first power input terminal of the power switch control circuit. Therefore, when the detachable battery carrier 12E is inserted into the accommodation room 111E, the power pin contact will contact with the electrode socket contact so that the detachable battery carrier 12E is electrically connected to the first power input terminal of the power switch control circuit. Therefore, it is easily assembled and conveniently connected.

The body sensor 16E of the LED light 1E, which is bump-shaped, is disposed at bottom of the light-transmissible bulb housing 115E. The body sensor 16E is used for sensing whether there is anybody entering a detection zone. When it is detected by the body sensor 16E that somebody enters the detection zone, a body sensing signal is generated and sent to the power switch control circuit for enabling the LED bulb 11E to provide illumination.

For example, the body sensor 16E in this embodiment may be an infrared body sensor. Alternatively, a microwave sensor may be used in lieu of the aforementioned infrared body sensor.

Of course, with reference to this embodiment, it is believed that any one skilled in the art may easily change structure designs to expose the battery device 8E in this embodiment outside and connect it to the battery carrier 12E. The above-mentioned way can be considered equivalent modification, and is not to be redundantly described herein.

Embodied Configuration 4

Please refer to FIG. 11 through FIG. 14. FIG. 11 is a schematic diagram of a structure illustrating an improved structure of an LED light according to a fourth preferred embodied configuration of the present invention. FIGS. 12~14 are exploded views of partial structures of the LED light shown in FIG. 11.

In this embodied configuration, the light body of the LED light 1F is an LED bulb 11F, which includes, from top to bottom, a bulb head 113F, a heat dissipater 114F and a light-transmissible bulb housing 115F. The LED light board (not labelled in this figure but referring to FIG. 1 and FIG. 2) and the power switch circuit board (not labelled in this figure but referring to FIG. 1 and FIG. 2) are disposed in the LED bulb 11E. The bulb head 113F is used to be plugged into a light socket (not labelled in this figure) electrically connected to an alternate light source, e.g. a public electricity supply (not labelled in this figure but referring to FIG. 1 and FIG. 2). Preferably, the heat dissipater 114F is disposed with a plurality of heat-dissipating fins 1141F at a side wall thereof, and has an accommodation chamber (not labelled in this figure) for accommodating the power switch circuit board therein.

The heat dissipater 114F has an accommodation room (refer to FIG. 8) at a side wall thereof for accommodating a battery coupling member. The battery coupling member is a detachable battery carrier 12F for disposing therein a battery device 8F in order to provide emergency backup power. The detachable battery carrier 12F is partially exposed outside the heat dissipater 114F so that the battery device 8F mounted in the detachable battery carrier 12F is also exposed so as to facilitate replacement by a user. The detachable battery carrier 12F is disposed with tenons 123 and 124 at top and bottom, respectively (as shown in FIG. 12) for engagement with and assembling to the light bulb 11F.

In this embodied configuration, there are two accommodation rooms symmetrically distributed on the side wall of the heat dissipater 114F for accommodating two detachable battery carriers 12F, respectively. Of course, the amount of the accommodation rooms and the amount of the detachable battery carriers 12F are not limited to two, and instead, it can be varied or designed equivalently by those skilled in the art according to practical applications and requirements.

The body sensor 16F of the LED light 1F, which is not bump-shaped, is disposed at bottom of the light-transmissible bulb housing 115F. The body sensor 16F is used for sensing whether there is anybody entering a detection zone. When it is detected by the body sensor 16F that somebody enters the detection zone, a body sensing signal is generated and sent to the power switch control circuit for enabling the LED bulb 11F to provide illumination.

For example, the body sensor 16F in this embodiment may be an infrared body sensor. Alternatively, a microwave sensor may be used in lieu of the aforementioned infrared body sensor.

One of the differences between this embodiment and the second embodiment, i.e. embodied configuration 2, is that the LED light 1F in this embodiment further includes a button switch 17F disposed in the battery base 18F inside (non-exposed from) the LED light 1F, and a battery circuit board 171F, on which the button switch 17F and the battery base 18F are disposed and connected to each other. In this manner, once power interruption occurs, a user may detach the LED light 1F from the above-mentioned light socket and use it as a flashlight. The button switch 17F serves as the illumination switch for controlling the flashlight.

Another one of the differences between this embodiment and the second embodiment is that the LED light 1F in this embodiment further includes an earthquake sensing module 19F disposed on a driver circuit board 20F of the LED light 1F. The earthquake sensing module 19F is a G-sensor, which has a microelectromechanical chip structure. The driver circuit board 20F may be disposed thereon driving and control elements at least including the power switch control circuit 13A, 13B and the switch 7A, 7B as shown in FIG. 1 and FIG. 2.

As such, once earthquake occurs, the earthquake sensing module 19F outputs an earthquake sensing signal to have the LED light board of the LED light 1F continuously or intermittently conduct illumination so as to provide emergency backup illumination.

Of course, when the LED light 1F is used as a handheld emergency illumination device, the earthquake sensing module 19F will be actively or passively changed into a disabled state to avoid misoperation.

Embodied Configuration 5

Please refer to FIG. 15 and FIG. 16. FIG. 15 is a schematic diagram of a structure illustrating an improved structure of an LED light according to a fifth preferred embodied configuration of the present invention. FIG. 16 is an exploded view of the LED light shown in FIG. 15.

In this embodied configuration, the light body of the LED light 1G is an LED bulb 11G, which includes, from top to bottom, a bulb head 113G, a heat dissipater 114G, a light-transmissible bulb housing 115G and a button switch 17G. The LED light board (not labelled in this figure but referring to FIG. 1 and FIG. 2) and the power switch circuit board (not labelled in this figure but referring to FIG. 1 and FIG. 2) are disposed in the LED bulb. The bulb head 113G is used to be plugged into a light socket (not labelled in this figure) electrically connected to an alternate light source, e.g. a public electricity supply (not labelled in this figure but referring to FIG. 1 and FIG. 2). Preferably, the heat dissipater 114G is disposed with a plurality of heat-dissipating fins 1141G at a side wall thereof, and has an accommodation chamber (not labelled in this figure) for accommodating the power switch circuit board therein.

The heat dissipater 114G has an accommodation room (refer to FIG. 8) at a side wall thereof for accommodating a battery coupling member. The battery coupling member is a detachable battery carrier 12G for disposing therein a battery device (not shown in the figure) in order to provide emergency backup power. The detachable battery carrier 12G is partially exposed outside the heat dissipater 114G so that the battery device mounted in the detachable battery carrier 12G is also exposed so as to facilitate replacement by a user. The detachable battery carrier 12G is disposed with tenons 125 and 126 at top and bottom, respectively (as shown in FIG. 16) for engagement with and assembling to the light bulb 11G.

In this embodied configuration, there are three accommodation rooms 111G evenly distributed on the side wall of the heat dissipater 114G for accommodating three detachable battery carriers 12G, respectively. Of course, the amount of the accommodation rooms and the amount of the detachable battery carriers 12G are not limited to three, and instead, it can be varied or designed equivalently by those skilled in the art according to practical applications and requirements.

Furthermore, the body sensor of the LED light 1F, which is not bump-shaped and is not shown in the figure, is disposed at bottom of the light-transmissible bulb housing 115G. The body sensor is used for sensing whether there is anybody entering a detection zone. When it is detected by the body sensor that somebody enters the detection zone, a body sensing signal is generated and sent to the power switch control circuit for enabling the LED bulb 11G to provide illumination. For example, the body sensor in this embodiment may be an infrared body sensor or a microwave sensor. Of course, once power interruption occurs, a user may detach the LED light 1G from the above-mentioned light socket and use it as a flashlight. The button switch 17G serves as the illumination switch for controlling the flashlight.

Described above are only preferred embodiments of the invention rather than confinement of claim scope. The equivalent changes or modifications under the disclosure of the present invention should also be included in the scope of the present invention.

The invention claimed is:

1. An LED light, comprising:
    a light body;
    a battery device, disposed at the light body;
    a power switch control circuit disposed in the light body for receiving an alternate current from an alternate current source or receiving a direct current from the battery device;
    an LED light board electrically connected to the power switch control circuit and disposed thereon a plurality of LED dies; and
    a body sensor electrically connected to the power switch control circuit and functioning for sensing whether there is anybody entering a detection zone, wherein when it is detected by the body sensor that somebody enters the detection zone, a body sensing signal is generated and sent to the power switch control circuit;
    wherein if an magnitude of the alternate current is greater than a specific value, the power switch control circuit has the received alternate current enter the LED light board to enable the output of a source light with a first lighting parameter from the LED light, and if the magnitude of the alternate current is less than the specific value, the power switch control circuit has the received direct current enter the LED light board to enable the output of a source light with a second lighting parameter from the LED light.

2. The LED light according to claim 1, wherein the LED light further comprises a switch disposed between the power switch control circuit and the alternate current source for a user to control illumination of the LED light board therevia; and/or when the power switch control circuit has the received direct current enter the LED light board, the constant output of the source light is enabled with the second lighting parameter from the LED light; and/or the first lighting parameter is different from the second lighting parameter; and/or the first lighting parameter and the second lighting parameter are a first illuminance and a second illuminance, respectively, or the first lighting parameter and the second lighting parameter are a first color temperature and a second color temperature, respectively.

3. The LED light according to claim 1, wherein the battery device is a replaceable element.

4. The LED light according to claim 3, wherein the light body is an LED tube and has an accommodation room for accommodating the battery device; and/or the light body is an LED bulb, which includes, from top to bottom, a bulb head, a heat dissipater and a light-transmissible bulb housing, the power switch control circuit is disposed inside the heat dissipater, and the heat dissipater has at least an accommodation room at an side edge thereof to facilitate the mounting of the battery device therein by a user; and/or the light body is an LED bulb, which includes, from top to bottom, a bulb head, a heat dissipater and a light-transmissible bulb housing, and the battery device is ring-shaped, sleeved around the bulb head by entering from top toward bottom, and disposed on an upper end of the heat dissipater; and/or the battery device is exposed and accessible by a user for replacement.

5. An LED light, comprising:
a light body;
an LED light board disposed in the light body and disposed thereon a plurality of LED dies;
at least one battery coupling member, which is a detachable battery carrier, disposed at an outside edge of the light body for accommodating therein a battery device which is a replaceable element; and
a power switch control circuit disposed in the light body and electrically coupled to an alternate current source, the at least one battery coupling member and the LED light board so that either of an alternate current received from the alternate current source and a direct current received from the battery device is transmitted to the LED light board.

6. The LED light according to claim 5, wherein the battery device is a storage battery, a lithium battery, a dry cell battery, or a rechargeable battery; and/or the LED light further comprises a switch disposed between the power switch control circuit and the alternate current source for a user to control illumination of the LED light board therevia; and/or the LED light further comprises a button switch, a battery circuit board and a hidden battery base, wherein the button switch and the hidden battery base are both connected to and disposed on the battery circuit board, and connected to each other, for a user to control the illumination of the LED light board by way of the button switch; and/or the LED light further comprises an earthquake sensing module for controlling the illumination of the LED light board while earthquake is happening, wherein the earthquake sensing module is a g-sensor, which has a microelectromechanical chip structure; and/or the battery device mounted onto the detachable battery carrier is exposed and accessible by a user for replacement.

7. The LED light according to claim 5, wherein the power switch control circuit includes a first power input terminal, a second power input terminal and a power output terminal, wherein the first power input terminal is electrically connected to the at least one battery coupling member, the second power input terminal is electrically connected to the alternate current source, and the power output terminal is electrically connected to the LED light board.

8. The LED light according to claim 5, wherein the light body is an LED tube and has an accommodation room for accommodating the battery coupling member.

9. The LED light according to claim 8, wherein the LED light body is a cylinder-shaped shell having a light-transmissible lower half, and both ends thereof are disposed with power plug pins electrically connected to a power input terminal of the power switch control circuit; and/or the accommodation room is disposed in an upper half of the light body; and/or the LED light body further comprises a body sensor disposed at a lower half of the LED light for sensing whether there is anybody entering a detection zone, wherein when it is detected by the body sensor that somebody enters the detection zone, a body sensing signal is generated.

10. The LED light according to claim 5, further comprising a body sensor disposed on the light body and functioning for sensing whether there is anybody entering a detection zone, wherein when it is detected by the body sensor that somebody enters the detection zone, a body sensing signal is generated.

11. The LED light according to claim 10, wherein the light body is an LED light bulb, which includes, from top to bottom, a bulb head, a heat dissipater and a light-transmissible bulb housing, and the battery coupling member is disposed at the heat dissipater.

12. The LED light according to claim 11, wherein the power switch control circuit is disposed inside the heat dissipater; and/or the heat dissipater is disposed with a plurality of heat-dissipating fins at a side wall thereof; and/or the body sensor is disposed at the bottom of the light-transmitting bulb housing.

13. The LED light according to claim 11, wherein the heat dissipater has an accommodation room at a side edge thereof for accommodating the battery coupling member.

14. The LED light according to claim 13, wherein the heat dissipater is disposed with a plurality of heat-dissipating fins at a side wall thereof, and the accommodation room is formed between at least two of the heat-dissipating fins for accommodating the detachable battery carrier; and/or the detachable battery carrier is disposed with a tenon and a positioning slot at the top and the bottom thereof, respectively, and the accommodation room is disposed with a mortise and a positioning piece at the top and the bottom thereof, respectively, wherein the tenon of the detachable battery carrier engages with the mortise of the accommodation room, and the positioning piece is inserted into the positioning slot of the detachable battery carrier.

15. The LED light according to claim 11, wherein the detachable battery carrier, the battery device is ring-shaped, and the detachable battery carrier having been mounted thereon the battery device is sleeved around the bulb head by entering from top toward bottom, and disposed on an upper end of the heat dissipater.

16. The LED light according to claim 15, wherein the bulb head is disposed with at least one engaging lock at a lower end of the bulb head, and when the detachable battery carrier is sleeved and disposed on the upper end of the heat dissipater, an upper end engaging lock of the detachable battery carrier is locked into the at least one engaging lock so that the lower end of the detachable battery carrier sustains against the upper end of the heat dissipater.

17. An LED light, comprising:
a bulb head;
a light-transmissible bulb housing;
an LED light board disposed thereon a plurality of LED dies;
a battery coupling member for accommodating therein a battery device which is a replaceable element;
a heat dissipater disposed between the bulb head and the light-transmissible bulb housing, and disposed with a plurality of heat-dissipating fins at a side wall thereof, wherein an accommodation room is formed between at least two of the heat-dissipating fins for accommodating the battery coupling member; and
a power switch control circuit disposed in the LED bulb light and electrically connected to an alternate current source, the battery coupling member and the LED light board for receiving and transmitting an alternate current from the alternate current source or receiving a direct current from the battery device to the LED light board.

18. The LED light according to claim 17, wherein the battery coupling member is a detachable battery carrier; and/or the battery device mounted onto the detachable battery carrier is exposed and accessible by a user for replacement; and/or the battery device is a storage battery, a lithium battery, a dry cell battery, or a rechargeable battery; and/or the LED light further comprises a switch disposed between the power switch control circuit and the alternate current source for a user to control illumination of the LED light board therevia; and/or the LED light further comprises a button switch, a battery circuit board and a hidden battery base, wherein the button switch and the hidden battery base are both connected to and disposed on the battery circuit board, and connected to each other, for a user to control the illumination of the LED light board by way of the button switch; and/or the LED light further comprises an earthquake sensing module for controlling the illumination of the LED light board while earthquake is happening, wherein the earthquake sensing module is a g-sensor, which has a microelectromechanical chip structure; and/or the battery device mounted onto the detachable battery carrier is exposed and accessible by a user for replacement.

19. The LED light according to claim 17, further comprising a body sensor disposed on the light body and functioning for sensing whether there is anybody entering a detection zone, wherein when it is detected by the body sensor that somebody enters the detection zone, a body sensing signal is generated.

20. The LED light according to claim 19, wherein the battery coupling member is a detachable battery carrier, which is disposed with a tenon and a positioning slot at the top and the bottom thereof, respectively, and the accommodation room is disposed with a mortise and a positioning piece at the top and the bottom thereof, respectively, wherein the tenon of the detachable battery carrier engages with the mortise of the accommodation room, and the positioning piece is inserted into the positioning slot of the detachable battery carrier.

\* \* \* \* \*